United States Patent
Yao et al.

(10) Patent No.: US 12,207,111 B2
(45) Date of Patent: Jan. 21, 2025

(54) METHOD AND SYSTEM FOR THRESHOLD MONITORING

(71) Applicant: Apple Inc., Cupertino, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 515 days.

(21) Appl. No.: 17/418,691

(22) PCT Filed: Dec. 27, 2019

(86) PCT No.: PCT/US2019/068754
§ 371 (c)(1),
(2) Date: Jun. 25, 2021

(87) PCT Pub. No.: WO2020/140041
PCT Pub. Date: Jul. 2, 2020

(65) Prior Publication Data
US 2022/0086669 A1   Mar. 17, 2022

Related U.S. Application Data

(60) Provisional application No. 62/785,355, filed on Dec. 27, 2018.

(51) Int. Cl.
*H04L 12/66* (2006.01)
*H04W 24/08* (2009.01)

(52) U.S. Cl.
CPC .................. *H04W 24/08* (2013.01)

(58) Field of Classification Search
CPC .......... H04W 24/08; H04W 12/08; H04W 12/106; H04W 12/121; H04W 12/122;
(Continued)

(56) References Cited

U.S. PATENT DOCUMENTS 7,672,814 B1 * 3/2010 Raanan ............... H04L 41/5058
702/182
7,822,837 B1   10/2010 Urban et al.
(Continued)

FOREIGN PATENT DOCUMENTS

CN   105808443 A   7/2016
CN   106383501 A   2/2017
(Continued)

OTHER PUBLICATIONS

International Search Report and Written Opinion, Mailed Mar. 4, 2020 in Related International Application No. PCT/US2019/068754; 13 pages.
(Continued)

*Primary Examiner* — Phuc H Tran
(74) *Attorney, Agent, or Firm* — Sterne, Kessler, Goldstein & Fox P.L.L.C.

(57) ABSTRACT

The present disclosure relates to methods and systems for carrying out performance measurement monitoring. Specifically, a consumer seeking performance measurement monitoring transmits a request to a management service producer that includes the parameters of the monitoring, such as the type of data to be monitored, a granularity period and one or more threshold values. In response, the management service producer communicates with a network function to carry out the monitoring. In particular, for each granularity period, a monitoring value is initialized. Then, either at the end of the granularity period or at intervals throughout the granularity period, the monitoring value is measured. If, at the time of measurement, the measurement value exceeds any one of the threshold values, a notification is transmitted to the consumer. Otherwise, monitoring continues for the remainder of the granularity period and/or is repeated for subsequent granularity periods.

19 Claims, 14 Drawing Sheets

(58) Field of Classification Search
CPC ............. H04W 24/02; H04W 28/0257; H04W 28/0268; H04W 28/08; H04W 4/38; H04W 4/40; H04W 4/90; H04W 72/542; H04W 72/56
See application file for complete search history.

(56) References Cited

U.S. PATENT DOCUMENTS

| | | | | |
|---|---|---|---|---|
| 2004/0064290 | A1* | 4/2004 | Cabral | G06F 11/348 702/182 |
| 2005/0262563 | A1* | 11/2005 | Mahone | H04L 43/00 726/22 |
| 2006/0052971 | A1* | 3/2006 | Lindberg | G07C 9/33 702/145 |
| 2009/0288165 | A1* | 11/2009 | Qiu | H04L 63/10 726/23 |
| 2013/0268663 | A1 | 10/2013 | Fujita | |
| 2015/0347262 | A1 | 12/2015 | Vyas et al. | |
| 2017/0093629 | A1* | 3/2017 | Cong | H04L 41/0866 |
| 2018/0132117 | A1* | 5/2018 | Senarath | H04L 43/026 |
| 2018/0241611 | A1 | 8/2018 | He et al. | |
| 2019/0140864 | A1* | 5/2019 | Gupta | H04W 72/1268 |
| 2019/0215235 | A1* | 7/2019 | Chou | G06F 9/45558 |
| 2020/0186410 | A1* | 6/2020 | Osawa | G06F 11/0709 |
| 2020/0192667 | A1* | 6/2020 | Ishii | G06F 9/30079 |
| 2020/0374181 | A1* | 11/2020 | Stenberg | H04L 43/0888 |
| 2022/0086669 | A1 | 3/2022 | Yao et al. | |

FOREIGN PATENT DOCUMENTS

| | | | |
|---|---|---|---|
| CN | 113228563 | | 8/2021 |
| KR | 20100065043 | A * | 6/2010 |
| KR | 20140067954 | A | 6/2014 |
| WO | WO-2018128894 | A1 * | 7/2018 |

OTHER PUBLICATIONS

Yang et al., "Performance Monitoring with Predictive QoS Analysis of LTE Backhaul," 2011 International Conference on Cyber-Enabled Distributed Computing and Knowledge Discovery, IEEE, Oct. 10, 2011; 8 pages.
3GPP TS 28.550 V16.7.0 (Dec. 2020): 3rd Generation Partnership Project; Technical Specification Group Services and System Aspects; Management and orchestration; Performance assurance (Release 16); 85 pages.
3GPP TS 32.412 V16.0.0 (Jul. 2020): 3rd Generation Partnership Project; Technical Specification Group Services and System Aspects; Telecommunication management; Performance Management (PM) Integration Reference Point (IRP): Information Service (IS) (Release 16); 68 pages.
3 GPP TS 28.541 V17.3.0 (Jun. 2021): 3rd Generation Partnership Project; Technical Specification Group Services and System Aspects; Management and orchestration; 5G Network Resource Model (NRM); Stage 2 and stage 3 (Release 17 ); 450 pages.
3 GPP TS 28.552 V17.3.1 (Jun. 2021): 3rd Generation Partnership Project; Technical Specification Group Services and System Aspects; Management and orchestration; 5G performance measurements (Release 17); 252 pages.
3 GPP TS 28.622 V16.8.0 (Jun. 2021): 3rd Generation Partnership Project; Technical Specification Group Services and System Aspects; Telecommunication management; Generic Network Resource Model (NRM) Integration Reference Point (IRP); Information Service (IS) (Release 16); 64 pages.
Korean Office Action directed to related Korean Application No. 10-2021-7020349, with English-language summary of the Office Action attached, mailed Aug. 27, 2023; 8 pages.
Ahmed Boubrima et al, "Optimal WSN Deployment Models for Air Pollution Monitoring", IEEE Transactions on Wireless Communications, May 31, 2017; 13 pages.
First Office Action directed to Chinese Application No. 201980086241.3, China National Intellectual Property Administration, mailed Feb. 11, 2023, 16 pages.

* cited by examiner

METHOD AND SYSTEM FOR THRESHOLD MONITORING

CROSS REFERENCE TO RELATED APPLICATIONS

This application is a National Stage entry from PCT/US2019/068754 filed on Dec. 27, 2019, which claims the benefit under 35 U.S.C. § 119 (e) of U.S. Provisional Application No. 62/785,355, filed Dec. 27, 2018, both of which are hereby incorporated by reference in their entireties.

FIELD

The embodiments are generally directed to performance monitoring within a wireless communications network.

BACKGROUND

The Third-Generation Partnership Project specification defines performance measurements that can be monitored. However, processing the values of all of the measurements requires substantial processing capacity and bandwidth.

SUMMARY

The present disclosure relates to methods and systems for carrying out performance measurement monitoring. Specifically, a consumer seeking performance measurement monitoring transmits a request to a management service producer that includes the parameters to be monitored, such as the type of data to be monitored, a granularity period and one or more threshold values. In response, the management service producer communicates with a network function to carry out the monitoring. In particular, for each granularity period, a monitoring value is initialized. Then, either at the end of the granularity period or at intervals throughout the granularity period, the monitoring value is measured. If, at the time of measurement, the measurement value exceeds any one of the threshold values, a notification is transmitted to the consumer. Otherwise, monitoring continues for the remainder of the granularity period and/or is repeated for subsequent granularity periods.

In an embodiment, a management service producer within a network node of a Third-Generation Partnership Project network receives a request from a consumer for performance measurement monitoring. The request includes information regarding data type to be monitored, threshold information and a granularity period. The management service producer transmits a request to a network function with the information received from the consumer. The network function responds with a confirmation, and the management service producer transmits a confirmation notification to the consumer. Termination of performance measurement monitoring occurs in substantially the same manner.

In another embodiment, a management service producer for monitoring performance measurements within a Third-Generation Partnership Project network, either alone or in conjunction with a network function, carries out performance measurement monitoring. Specifically, the management service producer receives a request from a consumer that defines monitoring parameters, including a type of data to be monitored, a granularity period, and at least one threshold value. Using this information, the management service producer initializes a performance measurement value for a first granularity period. Either at the end of the granularity period, or at regular intervals throughout the granularity period, a measurement is taken of the performance measurement value. The measured performance measurement value is then compared against the at least one threshold value. If the performance measurement value exceeds any of the threshold values at the time of measuring, then a notification is transmitted to the consumer. Alternatively, if the performance measurement value does not exceed any of the threshold values, then monitoring continues for the remainder of the current granularity period and/or additional granularity periods.

BRIEF DESCRIPTION OF THE DRAWINGS/FIGURES

Figure 1:
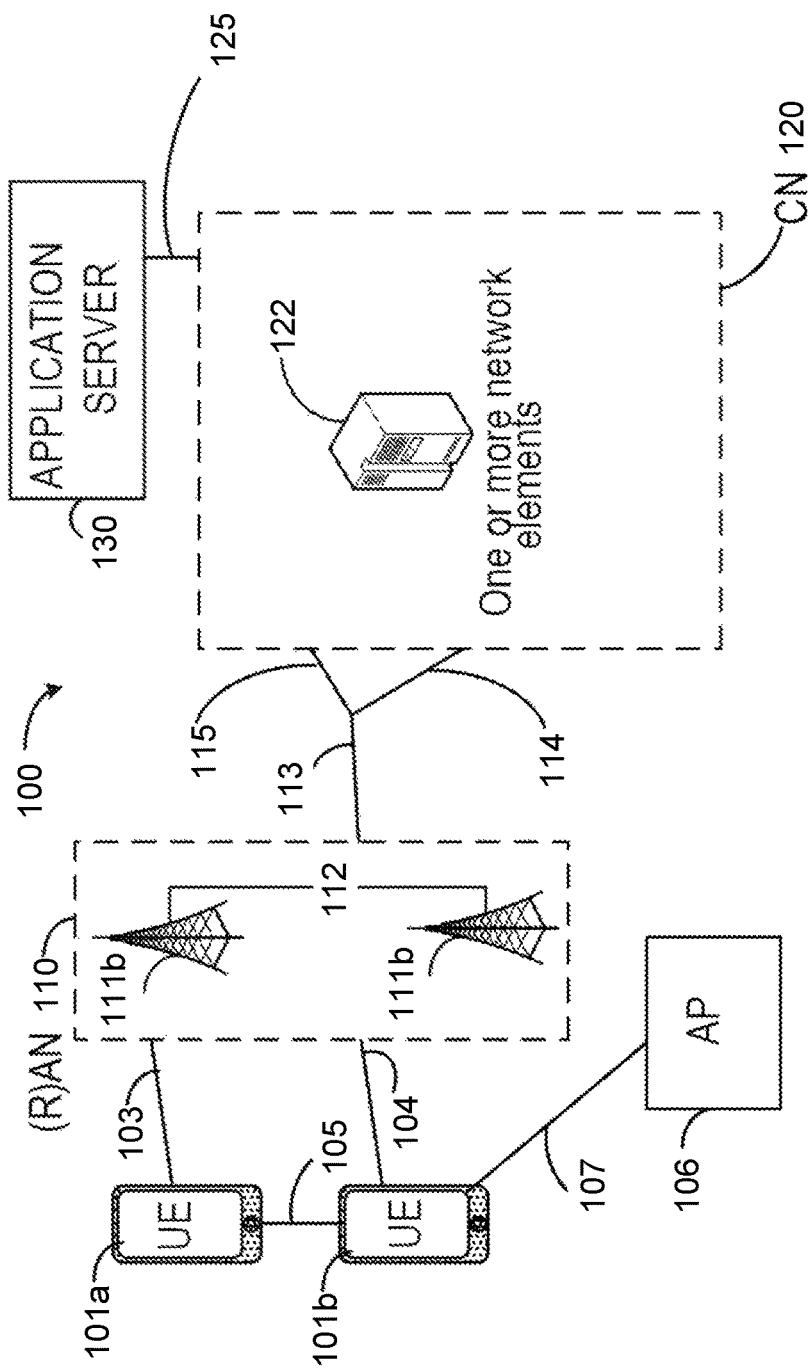
FIG. 1 illustrates an example system architecture within a network, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

There are many performance measurements defined, thus reporting the values for all of the measurements requires enough network bandwidth, and processing the values of all of the measurements needs certain processing capacity. For some measurements, the operator or consumer may not need to see their values all the time, but just needs to see when their values reach some certain thresholds for the granularity period (GP). Therefore, it is desirable to define the threshold monitoring service for performance management of 5G networks including network slicing.

The legacy threshold monitoring only supports to send the threshold crossing notifications at the end of the GP (see TS 32.412). For the measurements which are cumulative counters (e.g., number of failed handovers), the measurement value at the end of the GP may be far more than the threshold, and the threshold may be reached already much earlier before the end of the GP. However, the operator or consumer cannot get the notification in real-time when the threshold is reached, and thus operator or consumer has no way to take action in time to solve the performance issues.

So, it is desirable for the operator or consumer to receive the threshold crossing notifications for the cumulative counters in real-time without waiting until the end of the GP.

For the other kind of measurements (e.g., SI, gauge, DER), they are about the statistics of average or maximum values for the GP and the value for one instant sample within the GP cannot really present the performance, so it is okay to send the threshold crossing notifications at the end of GP.

Embodiments herein provide methods and system for performance threshold monitoring. The performance threshold monitoring provides an efficient way for performance monitoring (PM) of the networks.

In a first embodiment of the present disclosure, threshold monitoring is established for a consumer. In this embodiment, a 3GPP network function must have been deployed and be in operation. With this framework, a customer transmits a request to the management service producer. The request requests creation of threshold monitoring for network function performance measurements. In an embodiment, the request may include information about at least one of Information Object Class (IOC) name, IOC instance list, threshold information and monitor granularity period. With this information, the management service producer requests the network function to monitor performance measurements according to the threshold information and monitor granularity period. The management service producer then receives a response from the network function confirming enrollment in network performance measurement monitoring, and transmits a response to the consumer confirming the same. Table 1 below summarizes this embodiment.

TABLE 1

| Use case stage | Evolution/Specification | <<Uses>> Related use |
|---|---|---|
| Goal | To enable the authorized consumer to request creation of threshold monitoring for NF performance measurements. | |
| Actors and Roles | An authorized consumer of NF performance threshold monitoring service. | |
| Telecom resources | Producer of the NF performance threshold monitoring service. | |
| Assumptions | N/A | |
| Pre-conditions | The 3GPP NF has been deployed. The NF performance threshold monitoring service producer is in operation. The authorized consumer of NF performance threshold monitoring service has subscribed to the threshold crossing notifications. | |
| Begins when | The authorized consumer needs to create performance threshold monitoring for NF performance measurements. | |
| Step 1 (M) | The authorized consumer requests the NF performance threshold monitoring service producer to create performance threshold monitoring for NF performance measurements. The request contains the threshold information with the conditions for triggering the threshold crossing notifications. | |
| Step 2 (M) | The NF performance threshold monitoring service producer requests the NF(s) to monitor the performance measurements. | |
| Ends when | All the steps identified above are successfully completed. | |
| Exceptions | One of the steps identified above fails. | |
| Post-conditions | The NF performance threshold monitoring has been created. The NF monitors the performance measurements, and when the condition is met (e.g., a specific threshold is crossed or reached), the NF sends the threshold crossing notification to the consumer; or reports the threshold crossing event to NF performance threshold monitoring service producer, who then sends the threshold crossing notification to the consumer. | |
| Traceability | REQ-THMS_NF-FUN-1, REQ-THMS_NF-FUN-3 and REQ-THMS_NF-FUN-4 | |

In another embodiment, threshold monitoring can be terminated for a consumer. Similar to the previous embodiment, this embodiment also requires that the 3GPP network function has been deployed and in operation, and that the consumer is subscribed to the threshold crossing notifications. With this framework, the consumer transmits a request to the management service producer, requesting to terminate performance measurement monitoring. The management service producer receives the request and notifies the network function. The network function responds to the management service producer confirming termination, and the management service producer transmits a notification message to the consumer confirming the same. Table 2, below, summarizes this embodiment.

TABLE 2

| Use case stage | Evolution/Specification | <<Uses>> Related use |
|---|---|---|
| Goal | To enable the authorized consumer to request termination of threshold monitoring for NF performance measurements. | |
| Actors and Roles | An authorized consumer of NF performance threshold monitoring service. | |
| Telecom resources | Producer of the NF performance threshold monitoring service. | |
| Assumptions | N/A | |
| Pre-conditions | The 3GPP NF has been deployed. The NF performance threshold monitoring service producer is in operation. The threshold monitoring for NF performance measurements has been created for the authorized consumer. | |
| Begins when | The authorized consumer needs to terminate the performance threshold monitoring for NF performance measurements. | |
| Step 1 (M) | The authorized consumer requests the NF performance threshold monitoring service producer to terminate the performance threshold monitoring for NF performance measurements. | |
| Step 2 (M) | The NF performance threshold monitoring service producer stops the subject threshold monitoring, and requests the NF(s) to stop monitoring the performance measurements. | |
| Ends when | All the steps identified above are successfully completed. | |
| Exceptions | One of the steps identified above fails. | |
| Post-conditions | The threshold monitoring for NF performance measurements is stopped. | |
| Traceability | REQ-THMS_NF-FUN-2 | |

In another embodiment, the management service producer and the network function operate together to carry out the performance measurement monitoring. There are a number of functions available to support this functionality:

REQ-THMS_NF-FUN-1 The management service producer responsible for NF performance threshold monitoring shall have the capability to fulfill the consumer's request to create a performance threshold monitoring for the performance measurements of NF(s);

REQ-THMS_NF-FUN-2 The management service producer responsible for NF performance threshold monitoring shall have the capability to fulfill the request from its authorized consumer to terminate a performance threshold monitoring;

REQ-THMS_NF-FUN-3 The management service producer responsible for NF performance threshold monitoring shall have the capability to send the threshold crossing notification to the consumer, in case REQ-THMS_NF-FUN-4 is not supported (see NOTE 1); and REQ-THMS_NF-FUN-4 The NF should have the capability to send the threshold crossing notification to the consumer (see NOTE 1).

In embodiments, one out of the REQ-THMS_NF-FUN-3 and REQ-THMS_NF-FUN-4 shall be supported.

As discussed above, an embodiment allows a consumer to request performance measurement monitoring. Threshold monitoring can monitor the value of one or multiple measurement types, which are defined in TS 28.552. The threshold monitoring contains threshold information with conditions for triggering the threshold crossing notifications. When the condition is met, the NF or performance threshold monitoring service producer sends the threshold crossing notifications to the consumer in case it has subscribed to these notifications. The following Tables 3-5 list the input parameters, output parameters, and exceptions, respectively, that may be included in the request for monitoring functions.

TABLE 3

| Parameter Name | Qualifier | Information type | Comment |
|---|---|---|---|
| iOCName | M | The IOC name defined of the NRMs (e.g., as defined in TS 28.541 [3]), or the class name defined locally in the performance measurements specifications (e.g., TS 28.552 [2]). | It specifies one object class name. The consumer requests to create a threshold monitoring for one or more measurement type(s) of the instances of this class. |
| iOCInstanceList | M | List of DN | It specifies the list of DNs of object instances whose measurement type(s) are to be monitored by this threshold monitoring. An empty list means that for all instances (including the object instances existing at the time of threshold monitoring creation and the instances added later known by the management service producer, the measurements will be monitored. |
| thresholdInfoList | M | List of < measurementTypeName, direction, thresholdPack > | It specifies the threshold information. The measurementTypeName shall be in one of the following form: "family.measurementName.subcounter" for monitoring the measurement types with |

TABLE 3-continued

| Parameter Name | Qualifier | Information type | Comment |
|---|---|---|---|
| | | where thresholdpack is list of <br> < <br> thresholdLevel, <br> thresholdValue, <br> > | subcounters defined. <br> "family.measurementName" for monitoring the measurement types without subcounters defined. <br> The direction can be 'Increasing' or decreasing' of the measurement values. <br> If it is "Increasing", the threshold crossing notification is triggered when the measurement value equals or exceeds a thresholdValue. <br> If it is "Increasing", the threshold crossing notification is triggered when the measurement value equals or below a thresholdValue. <br> The thresholdLevel indicates the level for the threshold. The value of thresholdLevel is an integer and shall not be bigger than 4. |
| monitorGranularityPeriod | M | See granularityPeriod in sub-clause 6.1.1.2. | The monitorGranularityPeriod shall not be smaller than the minimum of the supported granularityPeriod for the measurement job for performance data Streaming (see granularityPeriod in sub-clause 6.1.1.2). |

TABLE 4

| Parameter Name | Qualifier | Matching Information | Comment |
|---|---|---|---|
| monitoringId | M | It identifies the threshold monitoring instance. | Unique identifier of the threshold monitoring from all the ongoing and stopped threshold monitoring that have been created for the subject consumer. |
| unsupportedList | M | List of < <br> iOCInstance, <br> measurementTypeName, <br> reason <br> > | To create a threshold monitoring, best-effort is required. The parameter of 'unsupportedList' must be returned if status = PartialSuccess. <br> The reason can be any of: <br> Measurement type name is unknown. <br> Measurement type name is invalid. <br> Measurement type name is not supported in the specific implementation. <br> Measurement type name is already monitored for the IOC instance with a different monitorGranularityPeriod. <br> The related IOC instance is unknown (e.g. it does not exist at the time of this operation invocation). <br> Insufficient capacity. |
| status | M | ENUM (Success, Failure, PartialSuccess) | An operation may fail because of a specified or unspecified reason. |

TABLE 5

| Exception Name | Definition |
|---|---|
| noValidClassOrInstances | Condition: iOCName is invalid or no iOCInstance is valid. <br> Returned Information: Name of the exception; status is set to 'Failure'. |
| invalidMonitorGranularityPeriod | Condition: monitorGranalarityPeriod is invalid. <br> Returned Information: Name of the exception; status is set to 'Failure'. |
| noValidMeasurementType | Condition: all measurement type names are invalid (i.e. none of the measurement type names are valid). <br> Returned information: output parameter status is set to 'Failure'. |
| invalidNumberOfThresholdPackElements | Condition: the number of the thresholdpack Elements exceeds the maximum (e.g., 4). <br> Returned information: output parameter status is set to 'Failure'. |

TABLE 5-continued

| Exception Name | Definition |
| --- | --- |
| noValidDirection | Condition: no direction is valid.<br>Returned information: output parameter status is set to 'Failure'. |

As discussed above, another embodiment allows a consumer to request termination of performance measurement monitoring. Whether the threshold monitoring is removed from the management service producer is vendor specific and out of scope of the present document. The threshold monitoring shall be stopped at the end of the monitorGranularityPeriod. The threshold crossing related notifications, if any, for the last monitorGranularityPeriod shall be emitted by the NF or performance threshold monitoring service producer. The following tables 6-8 show the input parameters, output parameters, and exceptions that may be included in the termination functions.

TABLE 6

| Parameter Name | Qualifier | Information type | Comment |
| --- | --- | --- | --- |
| monitoringId | M | See monitoringId in subclause 6.x.1.2.3 | It specifies the threshold monitoring to be stopped. |

TABLE 7

| Parameter Name | Qualifier | Matching Information | Comment |
| --- | --- | --- | --- |
| status | M | ENUM (Success, Failure) | An operation may fail because of a specified or unspecified reason. |

TABLE 8

| Exception Name | Definition |
| --- | --- |
| invalidThresholdMonitoring | Condition: monitoringId is invalid.<br>Returned information: output parameter status is set to 'Failure'. |

As part of the performance measurement monitoring, either the network function or the monitoring service producer will provide notifications to the consumer. This can be triggered in a variety of different ways, which is discussed in further detail below. Regardless of how the notification is triggered, Table 9, below lists and describes the various message fields that may be included within the notification message to the consumer.

TABLE 9

| Parameter Name | Qualifier | Information Type | Comment |
| --- | --- | --- | --- |
| objectClass | M, Y | "ManagedElement" (see TS 28.622 [5]), or "performance threshold monitoring service" | It indicates the class, whose instance emitted this notification. The sender could be NF, or the performance threshold monitoring service producer. |
| objectInstance | M, Y | DN of the instance of the "ManagedElement", or the identifier of the performance threshold monitoring service producer | It identifies the instance of the sender of this notification. The sender could be NF, or the performance threshold monitoring service producer. |
| notificationId | M, N | This is an identifier of the notification, which may be used to correlate notifications. | The unique identifier of the notification across all notifications sent by a particular management service producer throughout the time that correlation is significant. How identifiers of notifications are re-used to correlate notifications is outside of the scope of the present document. |
| eventTime | M, Y | It indicates the event occurrence time. | The semantics of Generalised Time specified by ITU-T shall be used here. |
| notificationType | M, Y | "notifyThresholdCrossing" | The type of notification, and it shall be assigned to "notifyThresholdCrossing" for this notification. |
| monitoringId | O, Y | See monitoringId | The monitoringId of the threshold monitoring where the threshold is set |

TABLE 9-continued

| Parameter Name | Qualifier | Information Type | Comment |
| --- | --- | --- | --- |
| startOfMonitoringGP | M, Y | It indicates the start of the monitoring granularity period. | The semantics of Generalised Time specified by ITU-T shall be used here. |
| endOfMonitoringGP | M, Y | It indicates the end of the monitoring granularity period. | The semantics of Generalised Time specified by ITU-T shall be used here. |
| monitoredObjectInstance | M, Y | DN of the monitored object instance | The DN of the object instance for which the measurementTypeName reported by this notification is monitored. |
| thresholdLevel | M, Y | It indicates the level of the threshold which is crossed or reached. | |
| measurementTypeName | M, Y | See measurementTypeName | It indicates the name of the measurement type whose value has reached or crossed the threshold. |
| measurementValue | M, Y | The type of the measurementValue for the measurement type is specified in the performance measurement definition in TS 28.552 [2], | It indicates the value of the measurement type which has reached or crossed the threshold. |
| additionalText | O, N | It provides additional information for this notification. | It carries vendor-specific semantics not defined in the present document. |

Figure 9:
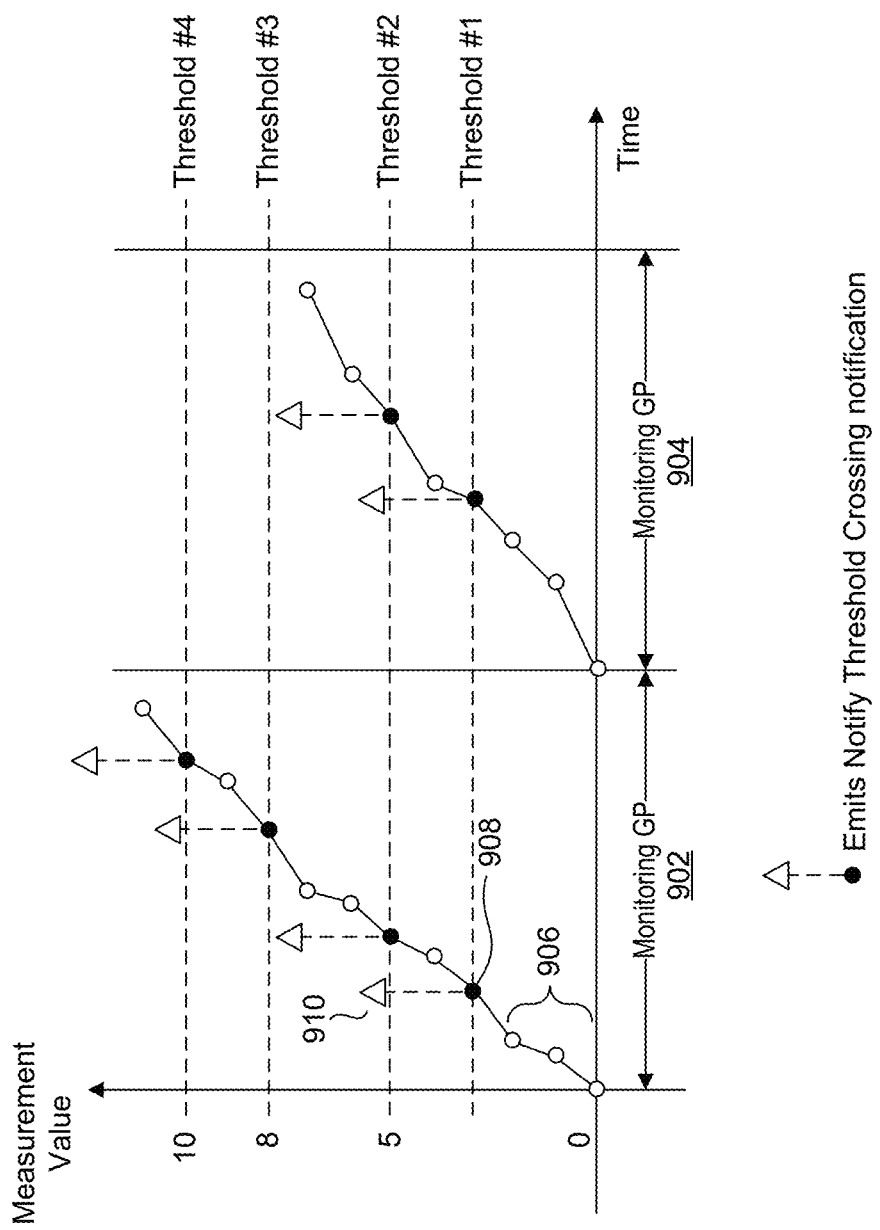
FIG. 9 illustrates a line graph of notifications emitted in response to measurement values exceeding one or more threshold values.

FIG. 9 illustrates a line graph of notifications emitted in response to measurement values exceeding one or more threshold values. Threshold crossing notifications triggering for cumulative counters. For the threshold monitoring of performance measurements that are cumulative counters, the notification notifyThresholdCrossing is emitted immediately when the cumulative counter of measured events reached the threshold, without waiting to the end of the monitoring granularity period (GP).

In other words, as illustrated in FIG. 9, performance measurements are tracked in real-time. Over the course of the monitoring, there will occur multiple monitoring granularity periods (labeled "Monitoring GP"). In addition, there may be several thresholds (e.g., "Thresholds 1-4"). During monitoring for cumulative counters, as shown in FIG. 9, notification messages are transmitted to the consumer whenever a performance measurement exceeds a threshold, regardless of the boundaries of the monitoring granularity period. Thus, as shown in FIG. 9, none of the first three measurements 906 (represented by circles on the line graph) in monitoring GP 902 exceed the first threshold, and thus no reporting is carried out. However, the fourth measurement 908 exceeds the threshold #1, and thus triggers a notification 910 (represented by the circle and arrow) to the consumer even though the monitoring GP has not yet concluded. This is repeated for the other measurements that exceed thresholds 2-4 prior to conclusion of the first monitoring GP 902. The next monitoring GP 904 resets the measurement, and the process begins again.

Figure 10:
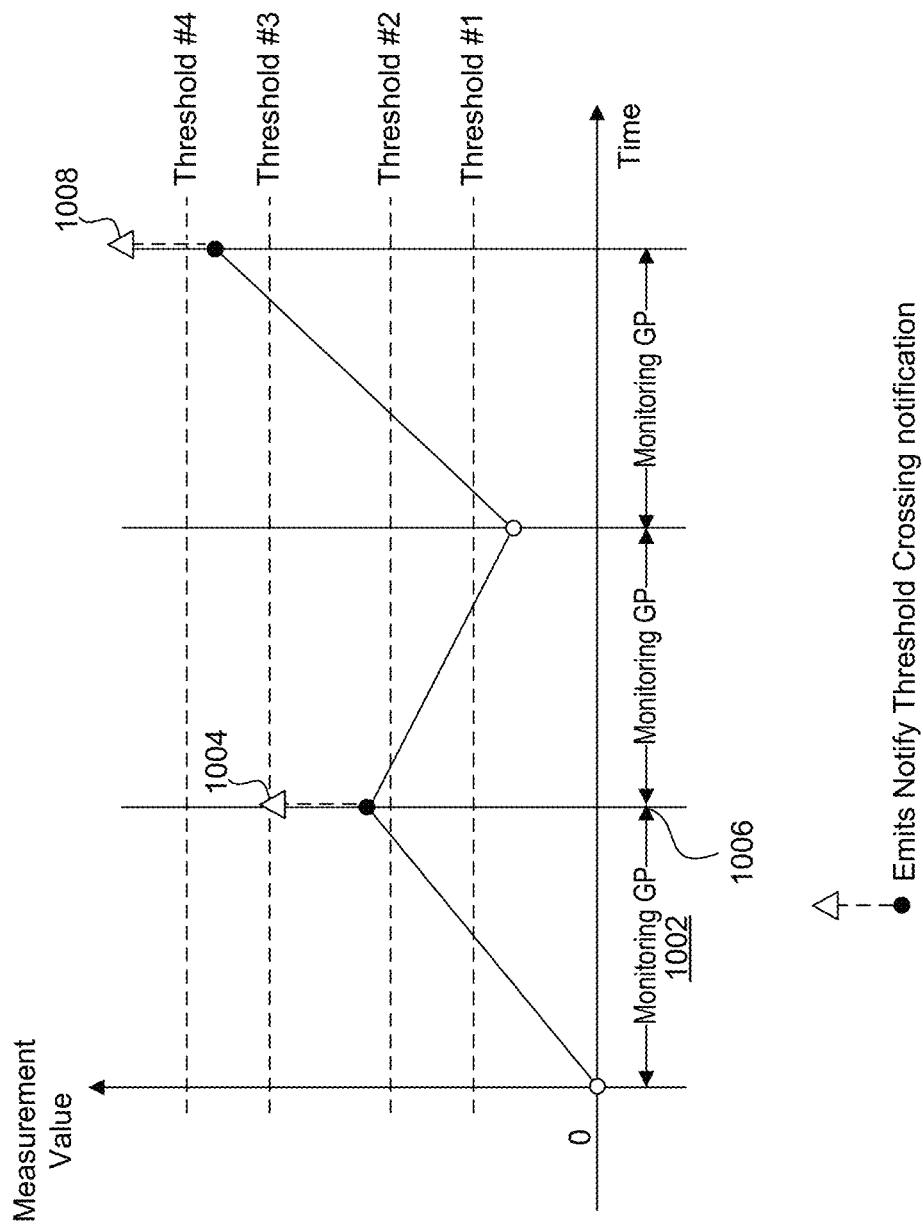
FIG. 10 illustrates a line graph of notifications emitted in response to threshold values being exceeded at the end of monitoring periods.

FIG. 10 illustrates a line graph of notifications emitted in response to threshold values being exceeded at the end of monitoring periods. For the threshold monitoring of performance measurement that are not cumulative counters, the notification notifyThresholdCrossing is emitted at the end of the monitoring granularity period (GP) if the measurement value reached or crossed the threshold.

In other words, as illustrated in FIG. 10, performance measurements are tracked throughout the granularity period. However, measurements are only taken for purposes of notification at the edges of the granularity period. In particular, as shown in FIG. 10, even though the measurements cross thresholds 1 and 2 during the first granularity period 1002, no notifications are transmitted until the GP edge 1006. At the edge, a determination of the measurement value is determined. Because the measurement value at the first GP edge 1006 exceeds a threshold value, a notification 1004 is transmitted to the consumer (illustrated as the yellow circle and arrow).

Similar processing occurs throughout the remaining GPs. For example, at the end of the second GP, the measurement value is once again determined (illustrated as empty circle). Because it is not above any of the threshold values, no notification is transmitted. However, at the edge of the third GP, another measurement value is taken. This measurement value once again exceeds a threshold value (thresholds 1-3), and thus causes a notification 1008 to be transmitted to the consumer.

Figure 11:
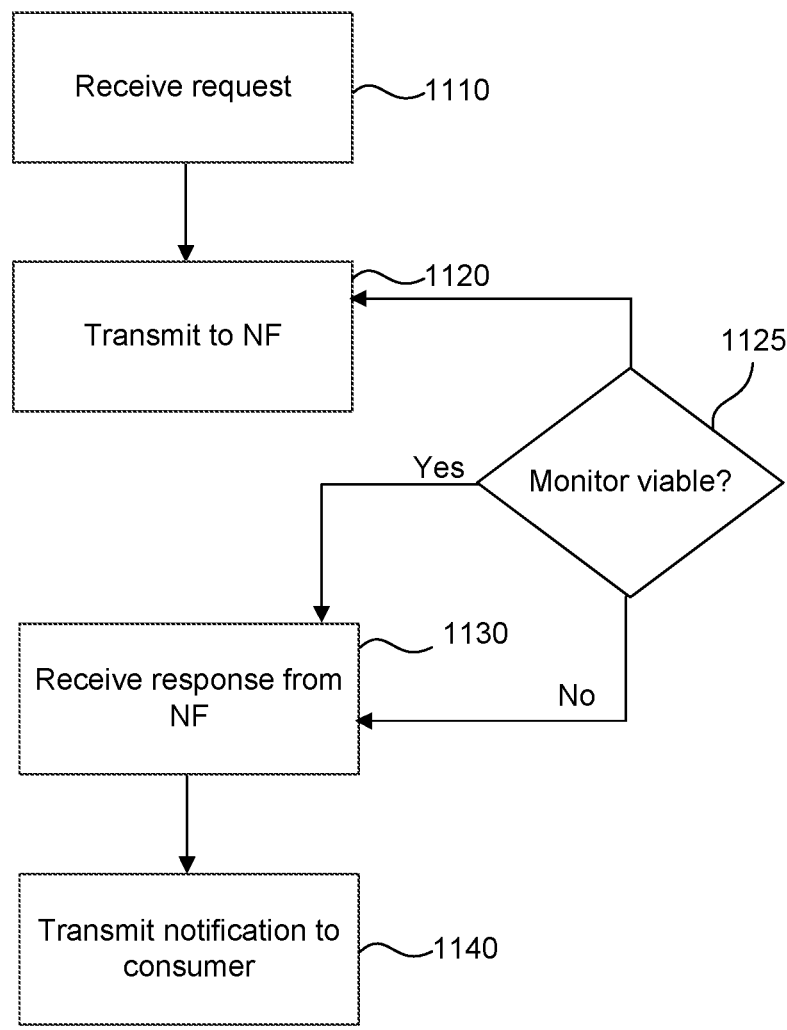
FIG. 11 illustrates a flowchart diagram of a method for subscribing to and canceling performance measurement monitoring.

FIG. 11 illustrates a flowchart diagram of a method 1100 for subscribing to and canceling performance measurement monitoring. As shown in FIG. 11, a management service producer receives a request from a consumer for performance measurement monitoring (1110). The management service producer transmits a monitoring request to a network function (1120) detailing the requested monitoring. The network function receives the request and determines whether it is capable of carrying out the requested monitoring (1125). If the requested monitoring is viable (1125-Y), then the network function transmits a response to the management service producer accepting the monitoring. Alternatively, if the network function is not capable of performing the requested monitoring (1125-N), then the network function transmits an exception to the management service producer explaining the reason for denial of the request. The management service producer receives the response from the network function (1130) and then transmits a notification to the consumer (1140) indicating whether the monitoring request has been accepted or not.

Figure 12:
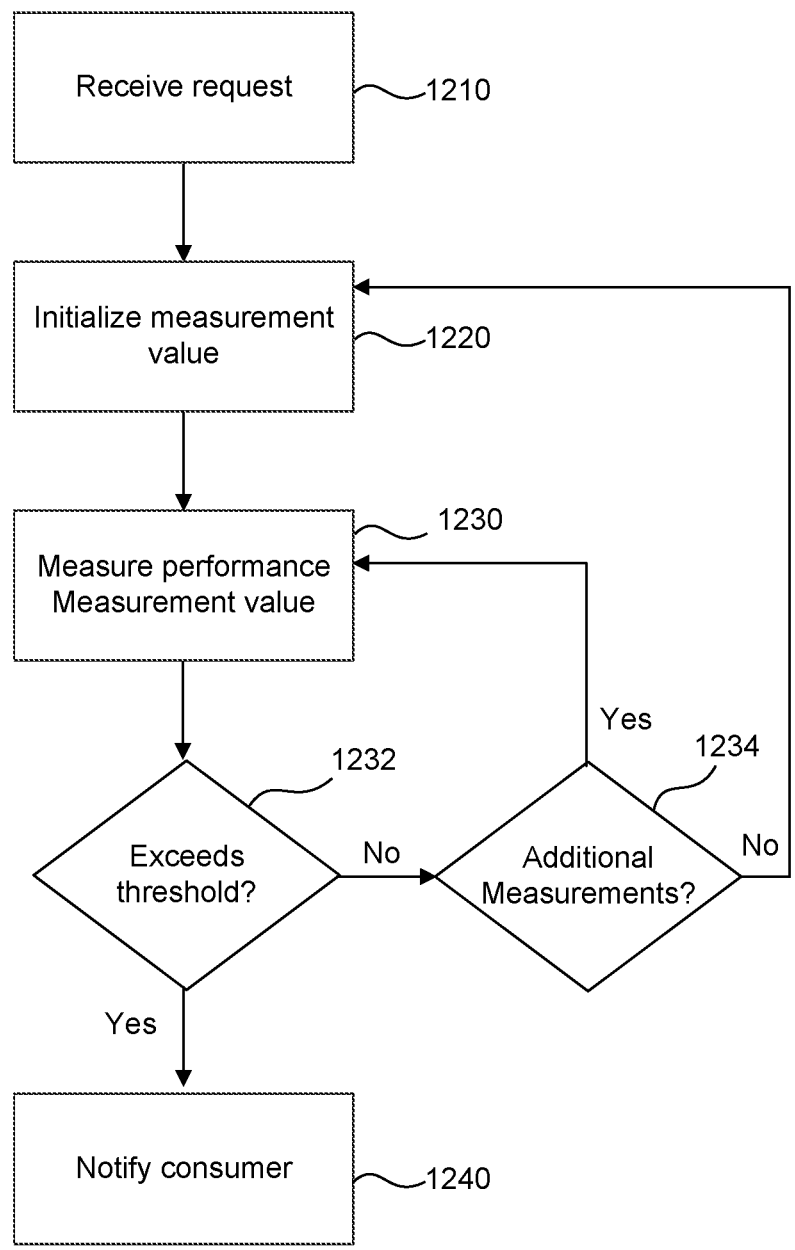
FIG. 12 illustrates a flowchart diagram of a method for carrying out performance measurement monitoring.

FIG. 12 illustrates a flowchart diagram of a method 1200 for carrying out performance measurement monitoring. As shown in FIG. 12, a request is received from a consumer (1210). The request includes the parameters for monitoring, including a data type to be monitored, a granularity period, and at least one threshold value. Performance measurement monitoring is then carried out based on this information. Specifically, for a given granularity period, a measurement value is initialized (1220) to a predetermined value. Then the measurement value is measured (1230) for the granularity period.

In an embodiment, the measurement value is measured only at a trailing edge of the granularity period. In an alternative embodiment, the measurement value is measured at regular intervals throughout the granularity period. Each time the measurement value is measured, a determination is made as to whether the measurement value exceeds a threshold (1232).

If the measurement value does not exceed the threshold (1232-N), then monitoring continues. Specifically, if there are additional measurements for the current granularity period (1234-Y), then the method returned to step 1230. Alternatively, if there are no additional measurements for the current granularity period, then the method returns to step 1220. If, on the other hand, the measurement is determined to exceed the threshold (1232-Y), then the consumer is notified (1240).

Systems and Implementations

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with an or RAN 110. In embodiments, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101*b* is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101*b*, RAN 110, and AP 106 may be configured to utilize LWA operation and/or LWIP operation. The LWA operation may involve the UE 101*b* in RRC_CO-NNECTED being configured by a RAN node 111*a-b* to utilize radio resources of LTE and WLAN. LWIP operation may involve the UE 101*b* using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111*a* and 111*b* (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 3B), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 220 of FIG. 2A) via an NG interface (discussed infra).

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101, RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In embodiments where the system 100 is an LTE system (e.g., when CN 120 is an EPC 220 as in FIG. 2A), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is an 5GC 220 as in FIG. 2A), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Embodiments where the CN 120 is a 5GC 120 are discussed in more detail with regard to FIG. 2A.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs. An example architecture wherein the CN 120 is an EPC 120 is shown by FIG. 2B.

Figure 2A:
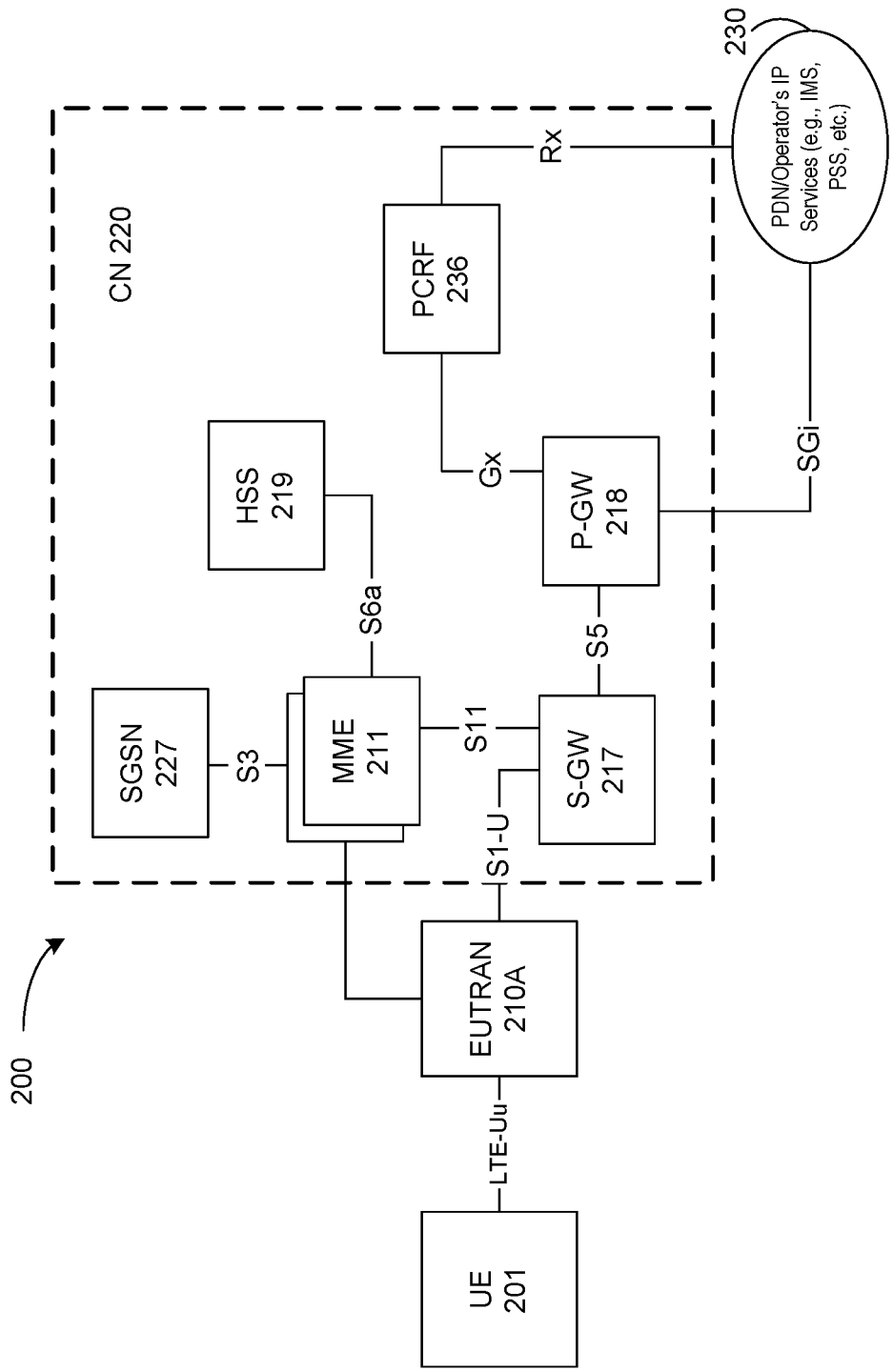
FIG. 2A illustrates a block diagram of an exemplary architecture of a system that includes a first core network, according to an embodiment.
Figure 2B:
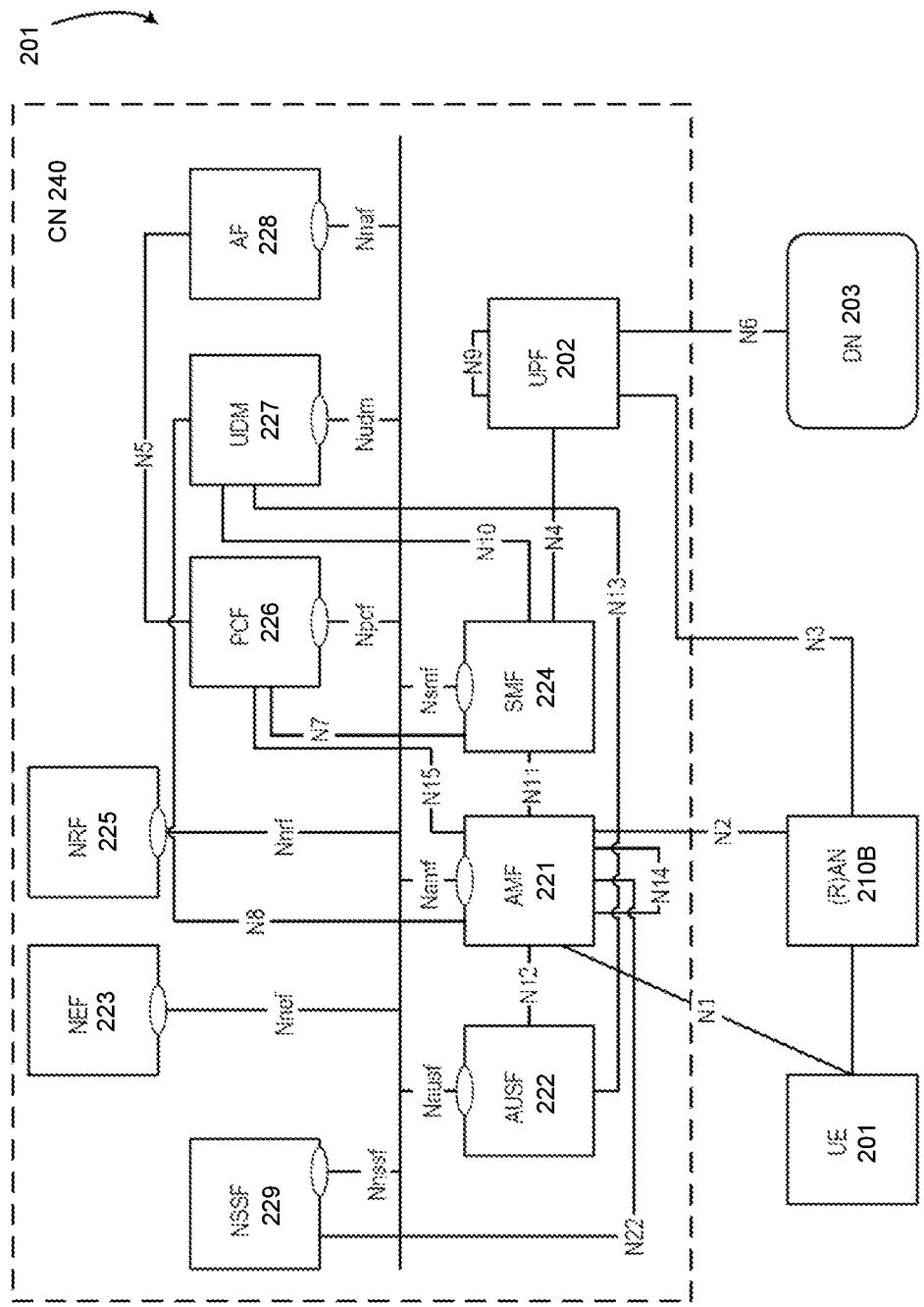
FIG. 2B illustrates a block diagram of an exemplary architecture of a system that includes a second core network, according to an embodiment.

FIG. 2A illustrates an example architecture of a system 200 including a first CN 220, in accordance with various embodiments. In this example, system 200 may implement the LTE standard wherein the CN 220 is an EPC 220 that corresponds with CN 120 of FIG. 1. Additionally, the UE 201 may be the same or similar as the UEs 101 of FIG. 1, and the E-UTRAN 210A may be a RAN that is the same or similar to the RAN 110 of FIG. 1, and which may include RAN nodes 111 discussed previously. The CN 220 may comprise MMEs 211, an S-GW 217, a P-GW 218, a HSS 219, and a SGSN 209.

The MMEs 211 may be similar in function to the control plane of legacy SGSN, and may implement MM functions to keep track of the current location of a UE 201. The MMEs 211 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 201, provide user identity confidentiality, and/or perform other like services to users/subscribers. Each UE 201 and the MME 211 may include an MM or EMM sublayer, and an MM context may be established in the UE 201 and the MME 211 when an attach procedure is successfully completed. The MM context may be a data structure or database object that stores MM-related information of the UE 201. The MMEs 211 may be coupled with the HSS 219 via an S6a reference point, coupled with the SGSN 209 via an S3 reference point, and coupled with the S-GW 217 via an S11 reference point.

The SGSN 209 may be a node that serves the UE 201 by tracking the location of an individual UE 201 and performing security functions. In addition, the SGSN 209 may perform Inter-EPC node signaling for mobility between 2G/3G and E-UTRAN 3GPP access networks; PDN and S-GW selection as specified by the MMEs 211; handling of UE 201 time zone functions as specified by the MMEs 211; and MME selection for handovers to E-UTRAN 3GPP access network. The S3 reference point between the MMEs 211 and the SGSN 209 may enable user and bearer information exchange for inter-3GPP access network mobility in idle and/or active states.

The HSS 219 may comprise a database for network users, including subscription-related information to support the network entities' handling of communication sessions. The EPC 220 may comprise one or several HSSs 219, depending on the number of mobile subscribers, on the capacity of the equipment, on the organization of the network, etc. For example, the HSS 219 can provide support for routing/ roaming, authentication, authorization, naming/addressing resolution, location dependencies, etc. An S6a reference point between the HSS 219 and the MMEs 211 may enable transfer of subscription and authentication data for authenticating/authorizing user access to the EPC 220 between HSS 219 and the MMEs 211.

The S-GW 217 may terminate the S1 interface 113 ("S1-U" in FIG. 2A) toward the RAN 210A, and routes data packets between the RAN 210A and the EPC 220. In addition, the S-GW 217 may be a local mobility anchor point for inter-RAN node handovers and also may provide an anchor for inter-3GPP mobility. Other responsibilities may include lawful intercept, charging, and some policy enforcement. The S11 reference point between the S-GW 217 and the MMEs 211 may provide a control plane between the MMEs 211 and the S-GW 217. The S-GW 217 may be coupled with the P-GW 218 via an S5 reference point.

The P-GW 218 may terminate an SGi interface toward a PDN 230. The P-GW 218 may route data packets between the EPC 220 and external networks such as a network including the application server 130 (alternatively referred to as an "AF") via an IP interface 125 (see e.g., FIG. 1). In embodiments, the P-GW 218 may be communicatively coupled to an application server (application server 130 of FIG. 1 or PDN 230 in FIG. 2A) via an IP communications interface 125 (see, e.g., FIG. 1). The S5 reference point between the P-GW 218 and the S-GW 217 may provide user plane tunneling and tunnel management between the P-GW 218 and the S-GW 217. The S5 reference point may also be used for S-GW 217 relocation due to UE 201 mobility and if the S-GW 217 needs to connect to a non-collocated P-GW 218 for the required PDN connectivity. The P-GW 218 may further include a node for policy enforcement and charging data collection (e.g., PCEF (not shown)). Additionally, the SGi reference point between the P-GW 218 and the packet data network (PDN) 230 may be an operator external public, a private PDN, or an intra operator packet data network, for example, for provision of IMS services. The P-GW 218 may be coupled with a PCRF 236 via a Gx reference point.

PCRF 236 is the policy and charging control element of the EPC 220. In a non-roaming scenario, there may be a single PCRF 236 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 236 may be communicatively coupled to the application server 230 via the P-GW 218. The application server 230 may signal the PCRF 236 to indicate a new service flow and select the appropriate QoS and charging parameters. The PCRF 236 may provision this rule into a PCEF (not shown) with the appropriate TFT and QCI, which commences the QoS and charging as specified by the application server 230. The Gx reference point between the PCRF 236 and the P-GW 218 may allow for the transfer of QoS policy and charging rules from the PCRF 236 to PCEF in the P-GW 218. An Rx reference point may reside between the PDN 230 (or "AF 230") and the PCRF 236.

FIG. 2B illustrates an architecture of a system 201 including a second CN 240 in accordance with various embodiments. The system 201 is shown to include a UE 201, which may be the same or similar to the UEs 101 and UE 201 discussed previously; a (R)AN 210B, which may be the same or similar to the RAN 110 and RAN 210B discussed previously, and which may include RAN nodes 111 discussed previously; and a DN 203, which may be, for example, operator services, Internet access or 3rd party services; and a 5GC 240. The 5GC 240 may include an AUSF 222; an AMF 221; a SMF 224; a NEF 223; a PCF 226; a NRF 225; a UDM 227; an AF 228; a UPF 202; and a NSSF 229.

The UPF 202 may act as an anchor point for intra-RAT and inter-RAT mobility, an external PDU session point of interconnect to DN 203, and a branching point to support multi-homed PDU session. The UPF 202 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 202 may include an uplink classifier to support routing traffic flows to a data network. The DN 203 may represent various network operator services, Internet access, or third party services. DN 203 may include, or be similar to, application server 130 discussed previously. The UPF 202 may interact with the SMF 224 via an N4 reference point between the SMF 224 and the UPF 202.

The AUSF 222 may store data for authentication of UE 201 and handle authentication-related functionality. The AUSF 222 may facilitate a common authentication framework for various access types. The AUSF 222 may communicate with the AMF 221 via an N12 reference point between the AMF 221 and the AUSF 222; and may communicate with the UDM 227 via an N13 reference point between the UDM 227 and the AUSF 222. Additionally, the AUSF 222 may exhibit an Nausf service-based interface.

The AMF 221 may be responsible for registration management (e.g., for registering UE 201, etc.), connection management, reachability management, mobility management, and lawful interception of AMF-related events, and access authentication and authorization. The AMF 221 may be a termination point for the an N11 reference point between the AMF 221 and the SMF 224. The AMF 221 may provide transport for SM messages between the UE 201 and the SMF 224, and act as a transparent proxy for routing SM messages. AMF 221 may also provide transport for SMS messages between UE 201 and an SMSF (not shown by FIG. 2A). AMF 221 may act as SEAF, which may include interaction with the AUSF 222 and the UE 201, receipt of an intermediate key that was established as a result of the UE 201 authentication process. Where USIM based authentication is used, the AMF 221 may retrieve the security material from the AUSF 222. AMF 221 may also include a SCM function, which receives a key from the SEA that it uses to derive access-network specific keys. Furthermore, AMF 221 may be a termination point of a RAN CP interface, which may include or be an N2 reference point between the (R)AN 210B and the AMF 221; and the AMF 221 may be a termination point of NAS (N1) signalling, and perform NAS ciphering and integrity protection.

AMF 221 may also support NAS signalling with a UE 201 over an N3 IWF interface. The N3IWF may be used to provide access to untrusted entities. N3IWF may be a termination point for the N2 interface between the (R)AN 210B and the AMF 221 for the control plane, and may be a termination point for the N3 reference point between the (R)AN 210B and the UPF 202 for the user plane. As such, the AMF 221 may handle N2 signalling from the SMF 224 and the AMF 221 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 201 and AMF 221 via an N1 reference point between the UE 201 and the AMF 221, and relay uplink and downlink user-plane packets between the UE 201 and UPF 202. The N3IWF also provides mechanisms for IPsec tunnel establishment with the UE 201. The AMF 221 may exhibit an Namf service-based interface, and may be a termination point for an N14 reference point between two AMFs 221 and an N17 reference point between the AMF 221 and a 5G-EIR (not shown by FIG. 2B).

The UE 201 may need to register with the AMF 221 in order to receive network services. RM is used to register or deregister the UE 201 with the network (e.g., AMF 221), and establish a UE context in the network (e.g., AMF 221). The UE 201 may operate in an RM-REGISTERED state or an RM-DEREGISTERED state. In the RM-DEREGISTERED state, the UE 201 is not registered with the network, and the UE context in AMF 221 holds no valid location or routing information for the UE 201 so the UE 201 is not reachable by the AMF 221. In the RM-REGISTERED state, the UE 201 is registered with the network, and the UE context in AMF 221 may hold a valid location or routing information for the UE 201 so the UE 201 is reachable by the AMF 221. In the RM-REGISTERED state, the UE 201 may perform mobility Registration Update procedures, perform periodic Registration Update procedures triggered by expiration of the periodic update timer (e.g., to notify the network that the UE 201 is still active), and perform a Registration Update procedure to update UE capability information or to re-negotiate protocol parameters with the network, among others.

The AMF 221 may store one or more RM contexts for the UE 201, where each RM context is associated with a specific access to the network. The RM context may be a data structure, database object, etc. that indicates or stores, inter alia, a registration state per access type and the periodic update timer. The AMF 221 may also store a 5GC MM context that may be the same or similar to the (E)MM context discussed previously. In various embodiments, the AMF 221 may store a CE mode B Restriction parameter of the UE 201 in an associated MM context or RM context. The AMF 221 may also derive the value, when needed, from the UE's usage setting parameter already stored in the UE context (and/or MM/RM context).

CM may be used to establish and release a signaling connection between the UE 201 and the AMF 221 over the N1 interface. The signaling connection is used to enable NAS signaling exchange between the UE 201 and the CN 240, and comprises both the signaling connection between the UE and the AN (e.g., RRC connection or UE-N3IWF connection for non-3GPP access) and the N2 connection for the UE 201 between the AN (e.g., RAN 210B) and the AMF 221. The UE 201 may operate in one of two CM states, CM-IDLE mode or CM-CONNECTED mode. When the UE 201 is operating in the CM-IDLE state/mode, the UE 201 may have no NAS signaling connection established with the AMF 221 over the N1 interface, and there may be (R)AN 210B signaling connection (e.g., N2 and/or N3 connections) for the UE 201. When the UE 201 is operating in the CM-CONNECTED state/mode, the UE 201 may have an established NAS signaling connection with the AMF 221 over the N1 interface, and there may be a (R)AN 210B signaling connection (e.g., N2 and/or N3 connections) for the UE 201. Establishment of an N2 connection between the (R)AN 210B and the AMF 221 may cause the UE 201 to transition from CM-IDLE mode to CM-CONNECTED mode, and the UE 201 may transition from the CM-CONNECTED mode to the CM-IDLE mode when N2 signaling between the (R)AN 210B and the AMF 221 is released.

The SMF 224 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 201 and a data network (DN) 203 identified by a Data Network Name (DNN). PDU sessions may be established upon UE 201 request, modified upon UE 201 and 5GC 240 request, and released upon UE 201 and 5GC 240 request using NAS SM signaling exchanged over the N1 reference point between the UE 201 and the SMF 224. Upon request from an application server, the 5GC 240 may trigger a specific application in the UE 201. In response to receipt of the trigger message, the UE 201 may pass the trigger message (or relevant parts/information of the trigger message) to one or more identified applications in the UE 201. The identified application(s) in the UE 201 may establish a PDU session to a specific DNN. The SMF 224 may check whether the UE 201 requests are compliant with user subscription information associated with the UE 201. In this regard, the SMF 224 may retrieve and/or request to receive update notifications on SMF 224 level subscription data from the UDM 227.

The SMF 224 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 224 may be included in the system 201, which may be between another SMF 224 in a visited network and the SMF 224 in the home network in roaming scenarios. Additionally, the SMF 224 may exhibit the Nsmf service-based interface.

The NEF 223 may provide means for securely exposing the services and capabilities provided by 3GPP network functions for third party, internal exposure/re-exposure, Application Functions (e.g., AF 228), edge computing or fog computing systems, etc. In such embodiments, the NEF 223 may authenticate, authorize, and/or throttle the AFs. NEF 223 may also translate information exchanged with the AF 228 and information exchanged with internal network functions. For example, the NEF 223 may translate between an AF-Service-Identifier and an internal 5GC information. NEF 223 may also receive information from other network functions (NFs) based on exposed capabilities of other network functions. This information may be stored at the NEF 223 as structured data, or at a data storage NF using standardized interfaces. The stored information can then be re-exposed by the NEF 223 to other NFs and AFs, and/or used for other purposes such as analytics. Additionally, the NEF 223 may exhibit an Nnef service-based interface.

The NRF 225 may support service discovery functions, receive NF discovery requests from NF instances, and provide the information of the discovered NF instances to the NF instances. NRF 225 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 225 may exhibit the Nnrf service-based interface.

The PCF 226 may provide policy rules to control plane function(s) to enforce them, and may also support unified policy framework to govern network behaviour. The PCF 226 may also implement an FE to access subscription information relevant for policy decisions in a UDR of the UDM 227. The PCF 226 may communicate with the AMF 221 via an N15 reference point between the PCF 226 and the AMF 221, which may include a PCF 226 in a visited network and the AMF 221 in case of roaming scenarios. The PCF 226 may communicate with the AF 228 via an N5 reference point between the PCF 226 and the AF 228; and with the SMF 224 via an N7 reference point between the PCF 226 and the SMF 224. The system 201 and/or CN 240 may also include an N24 reference point between the PCF 226 (in the home network) and a PCF 226 in a visited network. Additionally, the PCF 226 may exhibit an Npcf service-based interface.

The UDM 227 may handle subscription-related information to support the network entities' handling of communication sessions, and may store subscription data of UE 201. For example, subscription data may be communicated between the UDM 227 and the AMF 221 via an N8 reference point between the UDM 227 and the AMF. The UDM 227 may include two parts, an application FE and a UDR (the FE and UDR are not shown by FIG. 2B). The UDR may store subscription data and policy data for the UDM 227 and the PCF 226, and/or structured data for exposure and application data (including PFDs for application detection, application request information for multiple UEs 201) for the NEF 223. The Nudr service-based interface may be exhibited by the UDR 221 to allow the UDM 227, PCF 226, and NEF 223 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 224 via an N10 reference point between the UDM 227 and the SMF 224. UDM 227 may also support SMS management, wherein an SMS-FE implements the similar application logic as discussed previously. Additionally, the UDM 227 may exhibit the Nudm service-based interface.

The AF 228 may provide application influence on traffic routing, provide access to the NCE, and interact with the policy framework for policy control. The NCE may be a mechanism that allows the 5GC 240 and AF 228 to provide information to each other via NEF 223, which may be used for edge computing implementations. In such implementations, the network operator and third party services may be hosted close to the UE 201 access point of attachment to achieve an efficient service delivery through the reduced end-to-end latency and load on the transport network. For edge computing implementations, the 5GC may select a UPF 202 close to the UE 201 and execute traffic steering from the UPF 202 to DN 203 via the N6 interface. This may be based on the UE subscription data, UE location, and information provided by the AF 228. In this way, the AF 228 may influence UPF (re)selection and traffic routing. Based on operator deployment, when AF 228 is considered to be a trusted entity, the network operator may permit AF 228 to interact directly with relevant NFs. Additionally, the AF 228 may exhibit an Naf service-based interface.

The NSSF 229 may select a set of network slice instances serving the UE 201. The NSSF 229 may also determine allowed NSSAI and the mapping to the subscribed S-NSSAIs, if needed. The NSSF 229 may also determine the AMF set to be used to serve the UE 201, or a list of candidate AMF(s) 221 based on a suitable configuration and possibly by querying the NRF 225. The selection of a set of network slice instances for the UE 201 may be triggered by the AMF 221 with which the UE 201 is registered by interacting with the NSSF 229, which may lead to a change of AMF 221. The NSSF 229 may interact with the AMF 221 via an N22 reference point between AMF 221 and NSSF 229; and may communicate with another NSSF 229 in a visited network via an N31 reference point (not shown by FIG. 2B). Additionally, the NSSF 229 may exhibit an Nnssf service-based interface.

As discussed previously, the CN 240 may include an SMSF, which may be responsible for SMS subscription checking and verification, and relaying SM messages to/from the UE 201 to/from other entities, such as an SMS-GMSC/IWMSC/SMS-router. The SMS may also interact with AMF 221 and UDM 227 for a notification procedure that the UE 201 is available for SMS transfer (e.g., set a UE not reachable flag, and notifying UDM 227 when UE 201 is available for SMS).

The CN 120 may also include other elements that are not shown by FIG. 2B, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 2B). Individual NFs may share a UDSF for storing their respective unstructured data or individual NFs may each have their own UDSF located at or near the individual NFs. Additionally, the UDSF may exhibit an Nudsf service-based interface (not shown by FIG. 2B). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 2B for clarity. In one example, the CN 240 may include an Nx interface, which is an inter-CN interface between the MME (e.g., MME 211) and the AMF 221 in order to enable interworking between CN 240 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 3A:
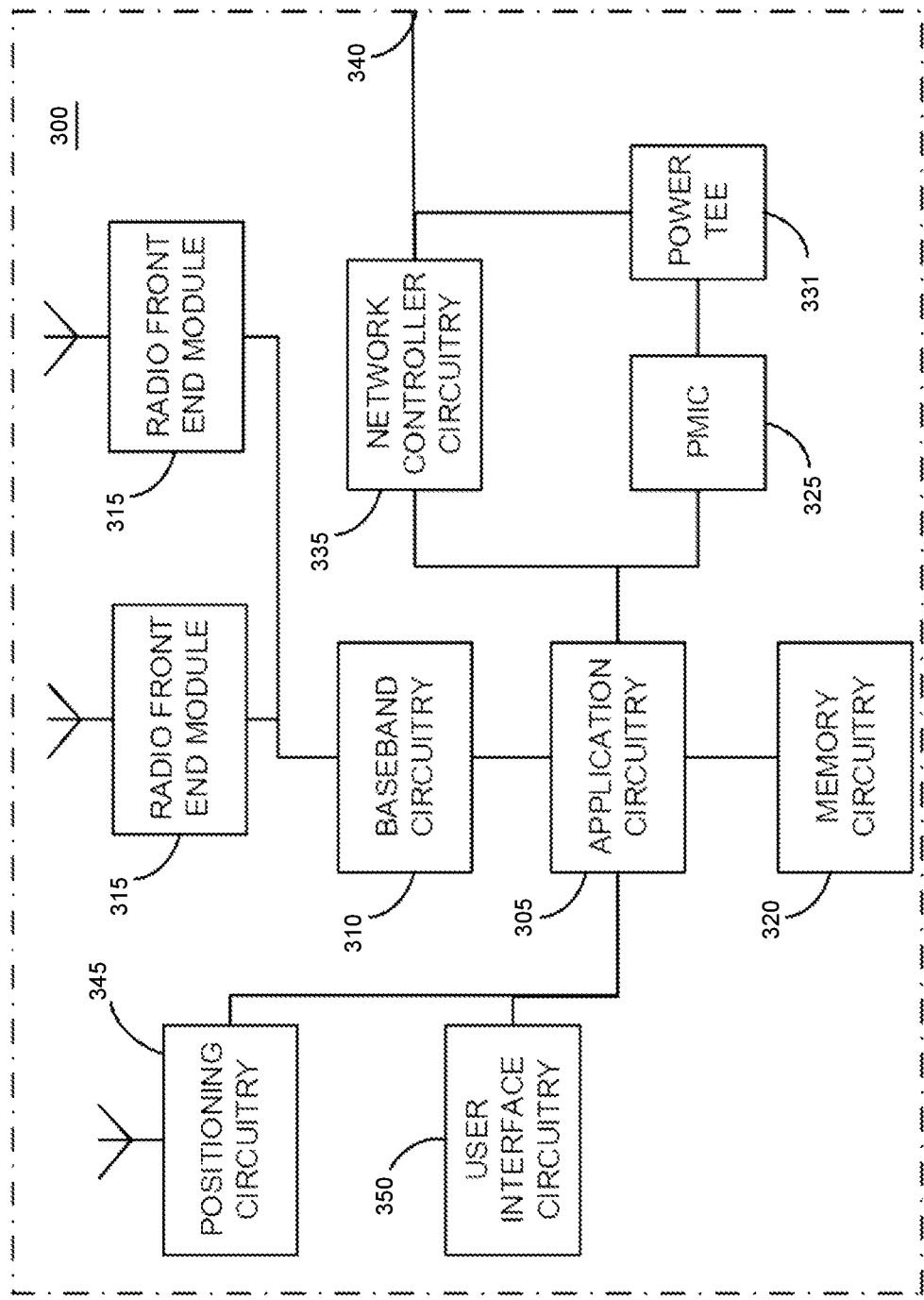
FIG. 3A illustrates a block diagram of an exemplary infrastructure equipment, according to an embodiment.

FIG. 3A illustrates an example of infrastructure equipment 300 in accordance with various embodiments. The infrastructure equipment 300 (or "system 300") may be implemented as a base station, radio head, RAN node such as the RAN nodes 111 and/or AP 106 shown and described previously, application server(s) 130, and/or any other element/device discussed herein. In other examples, the system 300 could be implemented in or by a UE.

The system 300 includes application circuitry 305, baseband circuitry 310, one or more radio front end modules (RFEMs) 315, memory circuitry 320, power management integrated circuitry (PMIC) 325, power tee circuitry 331, network controller circuitry 335, network interface connector 340, satellite positioning circuitry 345, and user interface 350. In some embodiments, the device 300 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 305 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 305 may be coupled with or may include memory/storage elements and may be configured to execute instructions stored in the memory/storage to enable various applications or operating systems to run on the system 300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 305 may comprise, or may be, a special-purpose processor/controller to operate according to the various embodiments herein. As examples, the processor(s) of application circuitry 305 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 300 may not utilize application circuitry 305, and instead may include a special-purpose processor/controller to process IP data received from an EPC or 5GC, for example.

In some implementations, the application circuitry 305 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 305 may comprise logic blocks or logic fabric, and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 310 are discussed infra with regard to FIG. 4.

User interface circuitry 350 may include one or more user interfaces designed to enable user interaction with the system 300 or peripheral component interfaces designed to enable peripheral component interaction with the system 300. User interfaces may include, but are not limited to, one or more physical or virtual buttons (e.g., a reset button), one or more indicators (e.g., light emitting diodes (LEDs)), a physical keyboard or keypad, a mouse, a touchpad, a touch-screen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 411 of FIG. 4 infra), and the RFEM may be connected to multiple antennas. In alternative implementations, both mmWave and sub-mmWave radio functions may be implemented in the same physical RFEM 315, which incorporates both mmWave antennas and sub-mmWave.

The memory circuitry 320 may include one or more of volatile memory including dynamic random access memory (DRAM) and/or synchronous dynamic random access memory (SDRAM), and nonvolatile memory (NVM)

including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 331 may provide for electrical power drawn from a network cable to provide both power supply and data connectivity to the infrastructure equipment 300 using a single cable.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocols. In some implementations, the network controller circuitry 335 may include multiple controllers to provide connectivity to other networks using the same or different protocols.

The positioning circuitry 345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 345 may include a Micro-Technology for Positioning, Navigation, and Timing (Micro-PNT) IC that uses a master timing clock to perform position tracking/estimation without GNSS assistance. The positioning circuitry 345 may also be part of, or interact with, the baseband circuitry 310 and/or RFEMs 315 to communicate with the nodes and components of the positioning network. The positioning circuitry 345 may also provide position data and/or time data to the application circuitry 305, which may use the data to synchronize operations with various infrastructure (e.g., RAN nodes 111, etc.), or the like.

The components shown by FIG. 3A may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 3B:
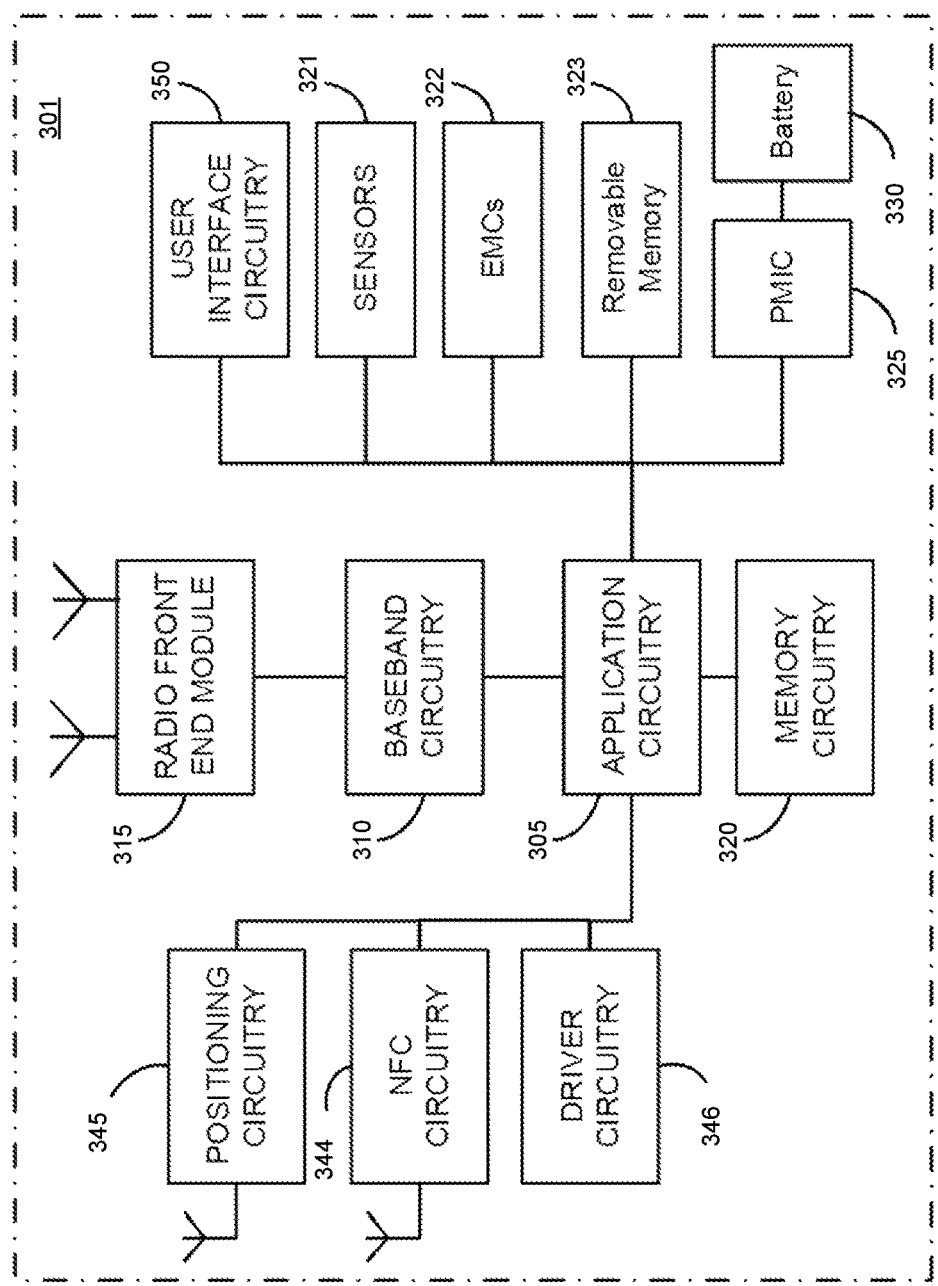
FIG. 3B illustrates a block diagram of an exemplary platform, according to an embodiment.

FIG. 3B illustrates an example of a platform 301 (or "device 301") in accordance with various embodiments. In embodiments, the platform 301 may be suitable for use as UEs 101, application servers 130, and/or any other element/device discussed herein. The platform 301 may include any combinations of the components shown in the example. The components of platform 301 may be implemented as integrated circuits (ICs), portions thereof, discrete electronic devices, or other modules, logic, hardware, software, firmware, or a combination thereof adapted in the computer platform 301, or as components otherwise incorporated within a chassis of a larger system. The block diagram of FIG. 3B is intended to show a high level view of components of the computer platform 301. However, some of the components shown may be omitted, additional components may be present, and different arrangement of the components shown may occur in other implementations.

Application circuitry 305 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 may be coupled with or may include memory/storage elements and may be configured to execute instructions stored in the memory/storage to enable various applications or operating systems to run on the system 301. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 305 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 305 may comprise, or may be, a special-purpose processor/controller to operate according to the various embodiments herein.

As examples, the processor(s) of application circuitry 305 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 305 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 305 may be a part of a system on a chip (SoC) in which the application circuitry 305 and other components are formed into a single integrated circuit, or a single package, such as the Edison™ or Galileo™ SoC boards from Intel® Corporation.

Additionally or alternatively, application circuitry 305 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may comprise logic blocks or logic fabric, and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 310 are discussed infra with regard to FIG. 4.

The RFEMs 315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 411 of FIG. 4 infra), and the RFEM may be connected to multiple antennas. In alternative implementations, both mmWave and sub-mmWave radio functions may be implemented in the same physical RFEM 315, which incorporates both mmWave antennas and sub-mmWave.

The memory circuitry 320 may include any number and type of memory devices used to provide for a given amount of system memory. As examples, the memory circuitry 320 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 320 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q7P), socketed memory modules, dual inline memory modules (DIMMs) including microDIMMs or MiniDIMMs, and/or soldered onto a motherboard via a ball grid array (BGA). In low power implementations, the memory circuitry 320 may be on-die memory or registers associated with the application circuitry 305. To provide for persistent storage of information such as data, applications, operating systems and so forth, memory circuitry 320 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 301 may incorporate the three-dimensional (3D) cross-point (XPOINT) memories from Intel® and Micron®.

Removable memory circuitry 323 may include devices, circuitry, enclosures/housings, ports or receptacles, etc. used to couple portable data storage devices with the platform 301. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 301 may also include interface circuitry (not shown) that is used to connect external devices with the platform 301. The external devices connected to the platform 301 via the interface circuitry include sensor circuitry 321 and electro-mechanical components (EMCs) 322, as well as removable memory devices coupled to removable memory circuitry 323.

The sensor circuitry 321 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 322 include devices, modules, or subsystems whose purpose is to enable platform 301 to change its state, position, and/or orientation, or move or control a mechanism or (sub)system. Additionally, EMCs 322 may be configured to generate and send messages/signalling to other components of the platform 301 to indicate a current state of the EMCs 322. Examples of the EMCs 322 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 301 is configured to operate one or more EMCs 322 based on one or more captured events and/or instructions or control signals received from a service provider and/or various clients.

In some implementations, the interface circuitry may connect the platform 301 with positioning circuitry 345. The positioning circuitry 345 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 345 may include a Micro-PNT IC that uses a master timing clock to perform position tracking/estimation without GNSS assistance. The positioning circuitry 345 may also be part of, or interact with, the baseband circuitry 310 and/or RFEMs 315 to communicate with the nodes and components of the positioning network. The positioning circuitry 345 may also provide position data and/or time data to the application circuitry 305, which may use the data to synchronize operations with various infrastructure (e.g., radio base stations), for turn-by-turn navigation applications, or the like In some implementations, the interface circuitry may connect the platform 301 with Near-Field Communication (NFC) circuitry 344. NFC circuitry 344 is configured to provide contactless, short-range communications based on radio frequency identification (RFID) standards, wherein magnetic field induction is used to enable communication between NFC circuitry 344 and NFC-enabled devices external to the platform 301 (e.g., an "NFC touchpoint"). NFC circuitry 344 comprises an NFC controller coupled with an antenna element and a processor coupled with the NFC controller. The NFC controller may be a chip/IC providing NFC functionalities to the NFC circuitry 344 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 344, or initiate data transfer between the NFC circuitry 344 and another active NFC device (e.g., a smartphone or an NFC-enabled POS terminal) that is proximate to the platform 301.

The driver circuitry 346 may include software and hardware elements that operate to control particular devices that are embedded in the platform 301, attached to the platform 301, or otherwise communicatively coupled with the platform 301. The driver circuitry 346 may include individual drivers allowing other components of the platform 301 to interact with or control various input/output (I/O) devices that may be present within, or connected to, the platform 301. For example, driver circuitry 346 may include a display driver to control and allow access to a display device, a touchscreen driver to control and allow access to a touchscreen interface of the platform 301, sensor drivers to obtain sensor readings of sensor circuitry 321 and control and allow access to sensor circuitry 321, EMC drivers to obtain actuator positions of the EMCs 322 and/or control and allow access to the EMCs 322, a camera driver to control and allow access to an embedded image capture device, audio drivers to control and allow access to one or more audio devices.

The power management integrated circuitry (PMIC) 325 (also referred to as "power management circuitry 325") may manage power provided to various components of the platform 301. In particular, with respect to the baseband circuitry 310, the PMIC 325 may control power-source selection, voltage scaling, battery charging, or DC-to-DC conversion. The PMIC 325 may often be included when the platform 301 is capable of being powered by a battery 330, for example, when the device is included in a UE 101, 201.

In some embodiments, the PMIC 325 may control, or otherwise be part of, various power saving mechanisms of the platform 301. For example, if the platform 301 is in an RRC_Connected state, where it is still connected to the RAN node as it expects to receive traffic shortly, then it may enter a state known as Discontinuous Reception Mode (DRX) after a period of inactivity. During this state, the platform 301 may power down for brief intervals of time and thus save power. If there is no data traffic activity for an extended period of time, then the platform 301 may transition off to an RRC_Idle state, where it disconnects from the network and does not perform operations such as channel quality feedback, handover, etc. The platform 301 goes into a very low power state and it performs paging where again it periodically wakes up to listen to the network and then powers down again. The platform 301 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 330 may power the platform 301, although in some examples the platform 301 may be mounted deployed in a fixed location, and may have a power supply coupled to an electrical grid. The battery 330 may be a lithium ion battery, a metal-air battery, such as a zinc-air battery, an aluminum-air battery, a lithium-air battery, and the like. In some implementations, such as in V2X applications, the battery 330 may be a typical lead-acid automotive battery.

In some implementations, the battery 330 may be a "smart battery," which includes or is coupled with a Battery Management System (BMS) or battery monitoring integrated circuitry. The BMS may be included in the platform 301 to track the state of charge (SoCh) of the battery 330. The BMS may be used to monitor other parameters of the battery 330 to provide failure predictions, such as the state of health (SoH) and the state of function (SoF) of the battery 330. The BMS may communicate the information of the battery 330 to the application circuitry 305 or other components of the platform 301. The BMS may also include an analog-to-digital (ADC) convertor that allows the application circuitry 305 to directly monitor the voltage of the battery 330 or the current flow from the battery 330. The battery parameters may be used to determine actions that the platform 301 may perform, such as transmission frequency, network operation, sensing frequency, and the like.

A power block, or other power supply coupled to an electrical grid may be coupled with the BMS to charge the battery 330. In some examples, the power block 330A may be replaced with a wireless power receiver to obtain the power wirelessly, for example, through a loop antenna in the computer platform 301. In these examples, a wireless battery charging circuit may be included in the BMS. The specific charging circuits chosen may depend on the size of the battery 330, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 350 includes various input/output (I/O) devices present within, or connected to, the platform 301, and includes one or more user interfaces designed to enable user interaction with the platform 301 and/or peripheral component interfaces designed to enable peripheral component interaction with the platform 301. The user interface circuitry 350 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 301. The output device circuitry may also include speakers or other audio emitting devices, printer(s), and/or the like. In some embodiments, the sensor circuitry 321 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 301 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 4:
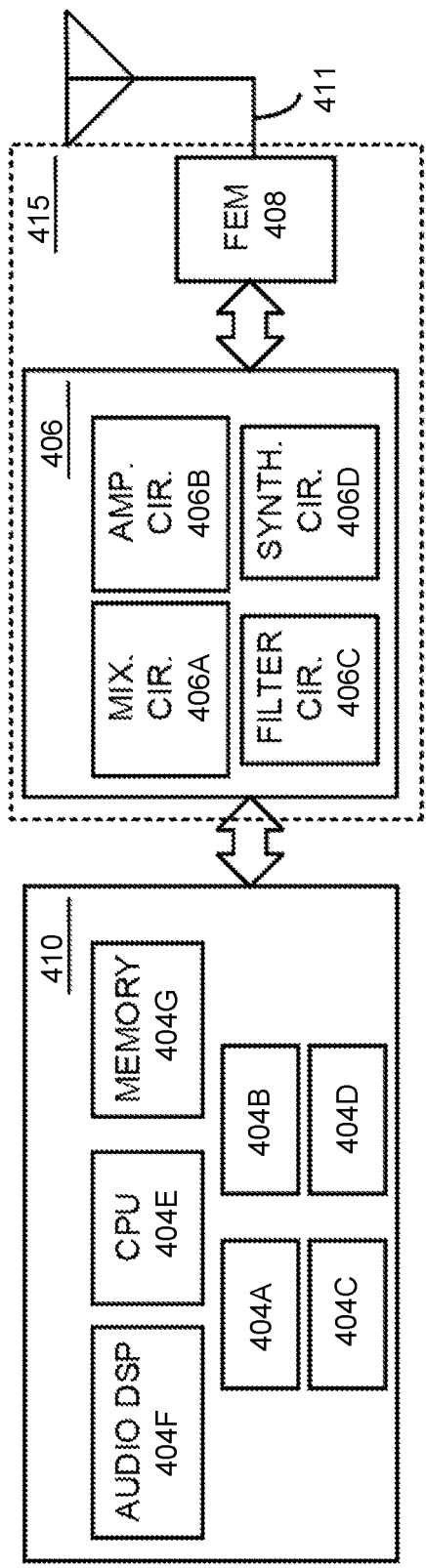
FIG. 4 illustrates a block diagram of an exemplary baseband processor that may be implemented within an access node, according to an embodiment.

FIG. 4 illustrates example components of baseband circuitry 410 and radio front end modules (RFEM) 415 in accordance with various embodiments. The baseband circuitry 410 corresponds to the baseband circuitry 310 of FIG. 3. The RFEM 415 corresponds to the RFEM 315 of FIG. 3. As shown, the RFEMs 415 may include Radio Frequency (RF) circuitry 406, front-end module (FEM) circuitry 408, antenna array 411 coupled together at least as shown.

The baseband circuitry 410 includes circuitry and/or control logic configured to carry out various radio/network protocol and radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 410 may include Fast-Fourier Transform (FFT), precoding, or constellation mapping/demapping functionality. In some embodiments, encoding/decoding circuitry of the baseband circuitry 410 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 410 is configured to process baseband signals received from a receive signal path of the RF circuitry 406 and to generate baseband signals for a transmit signal path of the RF circuitry 406. The baseband circuitry 410 is configured to interface with application circuitry 305 (see FIG. 3) for generation and processing of the baseband signals and for controlling operations of the RF circuitry 406. The baseband circuitry 410 may handle various radio control functions.

The aforementioned circuitry and/or control logic of the baseband circuitry 410 may include one or more single or multi-core processors. For example, the one or more processors may include a 3G baseband processor 404A, a 4G/LTE baseband processor 404B, a 5G/NR baseband processor 404C, or some other baseband processor(s) 404D for other existing generations, generations in development or to be developed in the future (e.g., sixth generation (6G), etc.). In other embodiments, some or all of the functionality of baseband processors 404A-D may be included in modules stored in the memory 404G and executed via a Central Processing Unit (CPU) 404E. In other embodiments, some or all of the functionality of baseband processors 404A-D may be provided as hardware accelerators (e.g., FPGAs, ASICs, etc.) loaded with the appropriate bit streams or logic blocks stored in respective memory cells. In various embodiments, the memory 404G may store program code of a real-time OS (RTOS), which when executed by the CPU 404E (or other baseband processor), is to cause the CPU 404E (or other baseband processor) to manage resources of the baseband circuitry 410, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 410 includes one or more audio digital signal processor(s) (DSP) 404F. The audio DSP(s) 404F include elements for compression/decompression and echo cancellation and may include other suitable processing elements in other embodiments.

In some embodiments, each of the processors 404A-404E include respective memory interfaces to send/receive data to/from the memory 404G. The baseband circuitry 410 may further include one or more interfaces to communicatively couple to other circuitries/devices, such as an interface to send/receive data to/from memory external to the baseband circuitry 410; an application circuitry interface to send/receive data to/from the application circuitry 305 of FIG. 3; an RF circuitry interface to send/receive data to/from RF circuitry 406 of FIG. 4; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 325.

In alternate embodiments (which may be combined with the above described embodiments), baseband circuitry 410 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 410 may include protocol processing circuitry with one or more instances of control circuitry (not shown) to provide control functions for the digital baseband circuitry and/or radio frequency circuitry (e.g., the radio front end modules 415).

Although not shown by FIG. 4, in some embodiments, the baseband circuitry 410 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 410 and/or RF circuitry 406 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 410 and/or RF circuitry 406 are part of a Wi-Fi communication system. In the second example, the protocol processing circuitry would operate Wi-Fi MAC and logical link control (LLC) functions. The protocol processing circuitry may include one or more memory structures (e.g., 404G) to store program code and data for operating the protocol functions, as well as one or more processing cores to execute the program code and perform various operations using the data. The baseband circuitry 410 may also support radio communications for more than one wireless protocol.

The various hardware elements of the baseband circuitry 410 discussed herein may be implemented, for example, as a solder-down substrate including one or more integrated circuits (ICs), a single packaged IC soldered to a main circuit board or a multi-chip module containing two or more ICs. In one example, the components of the baseband circuitry 410 may be suitably combined in a single chip or chipset, or disposed on a same circuit board. In another example, some or all of the constituent components of the baseband circuitry 410 and RF circuitry 406 may be implemented together such as, for example, a system on a chip (SoC) or System-in-Package (SiP). In another example, some or all of the constituent components of the baseband circuitry 410 may be implemented as a separate SoC that is communicatively coupled with and RF circuitry 406 (or multiple instances of RF circuitry 406). In yet another example, some or all of the constituent components of the baseband circuitry 410 and the application circuitry 305 may be implemented together as individual SoCs mounted to a same circuit board (e.g., a "multi-chip package").

In some embodiments, the baseband circuitry 410 may provide for communication compatible with one or more radio technologies. For example, in some embodiments, the baseband circuitry 410 may support communication with an E-UTRAN or other WMAN, a WLAN, a WPAN. Embodiments in which the baseband circuitry 410 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path, which may include circuitry to down-convert RF signals received from the FEM circuitry 408 and provide baseband signals to the baseband circuitry 410. RF circuitry 406 may also include a transmit signal path, which may include circuitry to up-convert baseband signals provided by the baseband circuitry 410 and provide RF output signals to the FEM circuitry 4108 for transmission.

In some embodiments, the receive signal path of the RF circuitry 406 may include mixer circuitry 406a, amplifier circuitry 406b and filter circuitry 406c. In some embodiments, the transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 410 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 410 and may be filtered by filter circuitry 406c.

In some embodiments, the mixer circuitry 406a of the receive signal path and the mixer circuitry 406a of the transmit signal path may include two or more mixers and may be arranged for quadrature downconversion and upconversion, respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a of the transmit signal path may be arranged for direct downconversion and direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 410 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage controlled oscillator (VCO), although that is not a requirement. Divider control input may be provided by either the baseband circuitry 410 or the application circuitry 305 depending on the desired output frequency. In some embodiments, a divider control input (e.g., N) may be determined from a look-up table based on a channel indicated by the application circuitry 305.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path, which may include circuitry configured to operate on RF signals received from antenna array 411, amplify the received signals and provide the amplified versions of the received signals to the RF circuitry 406 for further processing. FEM circuitry 408 may also include a transmit signal path, which may include circuitry configured to amplify signals for transmission provided by the RF circuitry 406 for transmission by one or more of antenna elements of antenna array 411. In various embodiments, the amplification through the transmit or receive signal paths may be done solely in the RF circuitry 406, solely in the FEM circuitry 408, or in both the RF circuitry 406 and the FEM circuitry 408.

In some embodiments, the FEM circuitry 408 may include a TX/RX switch to switch between transmit mode and receive mode operation. The FEM circuitry 408 may include a receive signal path and a transmit signal path. The receive signal path of the FEM circuitry 408 may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission by one or more antenna elements of the antenna array 411.

The antenna array 411 comprises one or more antenna elements, each of which is configured convert electrical signals into radio waves to travel through the air and to convert received radio waves into electrical signals. For example, digital baseband signals provided by the baseband circuitry 410 is converted into analog RF signals (e.g., modulated waveform) that will be amplified and transmitted via the antenna elements of the antenna array 411 including one or more antenna elements (not shown). The antenna elements may be omnidirectional, direction, or a combination thereof. The antenna elements may be formed in a multitude of arranges as are known and/or discussed herein. The antenna array 411 may comprise microstrip antennas or printed antennas that are fabricated on the surface of one or more printed circuit boards. The antenna array 411 may be formed in as a patch of metal foil (e.g., a patch antenna) in a variety of shapes, and may be coupled with the RF circuitry 406 and/or FEM circuitry 408 using metal transmission lines or the like.

Processors of the application circuitry 305 and processors of the baseband circuitry 410 may be used to execute elements of one or more instances of a protocol stack. For example, processors of the baseband circuitry 410, alone or in combination, may be used execute Layer 3, Layer 2, or Layer 1 functionality, while processors of the application circuitry 305 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 5:
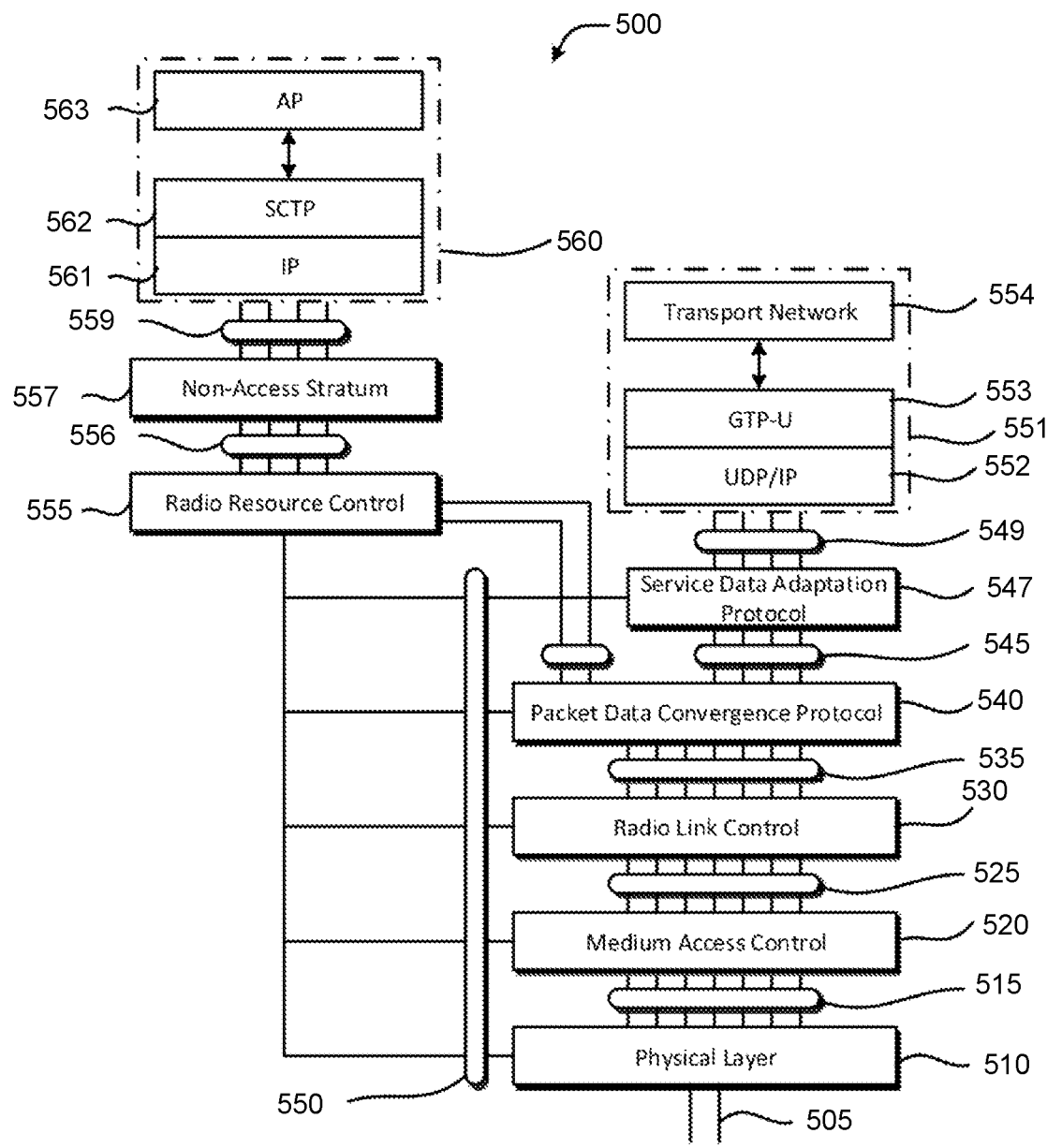
FIG. 5 illustrates a block diagram of exemplary protocol functions that may be implemented in a wireless communication device, according to an embodiment.

FIG. 5 illustrates various protocol functions that may be implemented in a wireless communication device according to various embodiments. In particular, FIG. 5 includes an arrangement 500 showing interconnections between various protocol layers/entities. The following description of FIG. 5 is provided for various protocol layers/entities that operate in conjunction with the 5G/NR system standards and LTE system standards, but some or all of the aspects of FIG. 5 may be applicable to other wireless communication network systems as well.

The protocol layers of arrangement 500 may include one or more of PHY 510, MAC 520, RLC 530, PDCP 540, SDAP 547, RRC 555, and NAS layer 557, in addition to other higher layer functions not illustrated. The protocol layers may include one or more service access points (e.g., items 559, 556, 550, 549, 545, 535, 525, and 515 in FIG. 5) that may provide communication between two or more protocol layers.

The PHY 510 may transmit and receive physical layer signals 505 that may be received from or transmitted to one or more other communication devices. The physical layer signals 505 may comprise one or more physical channels, such as those discussed herein. The PHY 510 may further perform link adaptation or adaptive modulation and coding (AMC), power control, cell search (e.g., for initial synchronization and handover purposes), and other measurements used by higher layers, such as the RRC 555. The PHY 510 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 510 may process requests from and provide indications to an instance of MAC 520 via one or more PHY-SAP 515. According to some embodiments, requests and indications communicated via PHY-SAP 515 may comprise one or more transport channels.

Instance(s) of MAC 520 may process requests from, and provide indications to, an instance of RLC 530 via one or more MAC-SAPs 525. These requests and indications communicated via the MAC-SAP 525 may comprise one or more logical channels. The MAC 520 may perform mapping between the logical channels and transport channels, multiplexing of MAC SDUs from one or more logical channels onto TBs to be delivered to PHY 510 via the transport channels, de-multiplexing MAC SDUs to one or more logical channels from TBs delivered from the PHY 510 via transport channels, multiplexing MAC SDUs onto TBs, scheduling information reporting, error correction through HARQ, and logical channel prioritization.

Instance(s) of RLC 530 may process requests from and provide indications to an instance of PDCP 540 via one or more radio link control service access points (RLC-SAP) 535. These requests and indications communicated via RLC-SAP 535 may comprise one or more RLC channels. The RLC 530 may operate in a plurality of modes of operation, including: Transparent Mode™, Unacknowledged Mode (UM), and Acknowledged Mode (AM). The RLC 530 may execute transfer of upper layer protocol data units (PDUs), error correction through automatic repeat request (ARQ) for AM data transfers, and concatenation, segmentation and reassembly of RLC SDUs for UM and AM data transfers. The RLC 530 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 540 may process requests from and provide indications to instance(s) of RRC 555 and/or instance(s) of SDAP 547 via one or more packet data convergence protocol service access points (PDCP-SAP) 545. These requests and indications communicated via PDCP-SAP 545 may comprise one or more radio bearers. The PDCP 540 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 547 may process requests from and provide indications to one or more higher layer protocol entities via one or more SDAP-SAP 549. These requests and indications communicated via SDAP-SAP 549 may comprise one or more QoS flows. The SDAP 547 may map QoS flows to DRBs, and vice versa, and may also mark QFIs in DL and UL packets. A single SDAP entity 547 may be configured for an individual PDU session. In the UL direction, the NG-RAN 110 may control the mapping of QoS Flows to DRB(s) in two different ways, reflective mapping or explicit mapping. For reflective mapping, the SDAP 547 of a UE 101 may monitor the QFIs of the DL packets for each DRB, and may apply the same mapping for packets flowing in the UL direction. For a DRB, the SDAP 547 of the UE 101 may map the UL packets belonging to the QoS flows(s) corresponding to the QoS flow ID(s) and PDU session observed in the DL packets for that DRB. To enable reflective mapping, the NG-RAN 210B may mark DL packets over the Uu interface with a QoS flow ID. The explicit mapping may involve the RRC 555 configuring the SDAP 547 with an explicit QoS flow to DRB mapping rule, which may be stored and followed by the SDAP 547. In embodiments, the SDAP 547 may only be used in NR implementations and may not be used in LTE implementations.

The RRC 555 may configure, via one or more management service access points (M-SAP), aspects of one or more protocol layers, which may include one or more instances of PHY 510, MAC 520, RLC 530, PDCP 540 and SDAP 547. In embodiments, an instance of RRC 555 may process requests from and provide indications to one or more NAS entities 557 via one or more RRC-SAPs 556. The main services and functions of the RRC 555 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 557 may form the highest stratum of the control plane between the UE 101 and the AMF 221. The NAS 557 may support the mobility of the UEs 101 and the session management procedures to establish and maintain IP connectivity between the UE 101 and a P-GW in LTE systems.

According to various embodiments, one or more protocol entities of arrangement 500 may be implemented in UEs 101, RAN nodes 111, AMF 221 in NR implementations or MME 211 in LTE implementations, UPF 202 in NR implementations or S-GW 217 and P-GW 218 in LTE implementations, or the like to be used for control plane or user plane communications protocol stack between the aforementioned devices. In such embodiments, one or more protocol entities that may be implemented in one or more of UE 101, gNB 111, AMF 221, etc. may communicate with a respective peer protocol entity that may be implemented in or on another device using the services of respective lower layer protocol entities to perform such communication. In some embodiments, a gNB-CU of the gNB 111 may host the RRC 555, SDAP 547, and PDCP 540 of the gNB that controls the operation of one or more gNB-DUs, and the gNB-DUs of the gNB 111 may each host the RLC 530, MAC 520, and PHY 510 of the gNB 111.

In a first example, a control plane protocol stack may comprise, in order from highest layer to lowest layer, NAS 557, RRC 555, PDCP 540, RLC 530, MAC 520, and PHY 510. In this example, upper layers 560 may be built on top of the NAS 557, which includes an IP layer 561, an SCTP 562, and an application layer signaling protocol (AP) 563.

In NR implementations, the AP 563 may be an NG application protocol layer (NGAP or NG-AP) 563 for the NG interface 113 defined between the NG-RAN node 111 and the AMF 221, or the AP 563 may be an Xn application protocol layer (XnAP or Xn-AP) 563 for the Xn interface 112 that is defined between two or more RAN nodes 111.

The NG-AP 563 may support the functions of the NG interface 113 and may comprise Elementary Procedures (EPs). An NG-AP EP may be a unit of interaction between the NG-RAN node 111 and the AMF 221. The NG-AP 563 services may comprise two groups: UE-associated services (e.g., services related to a UE 101) and non-UE-associated services (e.g., services related to the whole NG interface instance between the NG-RAN node 111 and AMF 221). These services may include functions including, but not limited to: a paging function for the sending of paging requests to NG-RAN nodes 111 involved in a particular paging area; a UE context management function for allowing the AMF 221 to establish, modify, and/or release a UE context in the AMF 221 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 221; a NAS node selection function for determining an association between the AMF 221 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 563 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210A), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 563 may be an S1 Application Protocol layer (S1-AP) 563 for the S1 interface 113 defined between an E-UTRAN node 111 and an MME, or the AP 563 may be an X2 application protocol layer (X2AP or X2-AP) 563 for the X2 interface 112 that is defined between two or more E-UTRAN nodes 111.

The S1 Application Protocol layer (S1-AP) 563 may support the functions of the S1 interface, and similar to the NG-AP discussed previously, the S1-AP may comprise S1-AP EPs. An S1-AP EP may be a unit of interaction between the E-UTRAN node 111 and an MME 211 within an LTE CN 120. The S1-AP 563 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 563 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 562 may provide guaranteed delivery of application layer messages (e.g., NGAP or XnAP messages in NR implementations, or S1-AP or X2AP messages in LTE implementations). The SCTP 562 may ensure reliable delivery of signaling messages between the RAN node 111 and the AMF 221/MME 211 based, in part, on the IP protocol, supported by the IP 561. The Internet Protocol layer (IP) 561 may be used to perform packet addressing and routing functionality. In some implementations the IP layer 561 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 547, PDCP 540, RLC 530, MAC 520, and PHY 510. The user plane protocol stack may be used for communication between the UE 101, the RAN node 111, and UPF 202 in NR implementations or an S-GW 217 and P-GW 218 in LTE implementations. In this example, upper layers 551 may be built on top of the SDAP 547, and may include a user datagram protocol (UDP) and IP security layer (UDP/IP) 552, a General Packet Radio Service (GPRS) Tunneling Protocol for the user plane layer (GTP-U) 553, and a User Plane PDU layer (UP PDU) 563.

The transport network layer 554 (also referred to as a "transport layer") may be built on IP transport, and the GTP-U 553 may be used on top of the UDP/IP layer 552 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 553 may be used for carrying user data within the GPRS core network and between the radio access network and the core network. The user data transported can be packets in any of IPv4, IPv6, or PPP formats, for example. The UDP/IP 552 may provide checksums for data integrity, port numbers for addressing different functions at the source and destination, and encryption and authentication on the selected data flows. The RAN node 111 and the S-GW 217 may utilize an S1-U interface to exchange user plane data via a protocol stack comprising an L1 layer (e.g., PHY 510), an L2 layer (e.g., MAC 520, RLC 530, PDCP 540, and/or SDAP 547), the UDP/IP layer 552, and the GTP-U 553. The S-GW 217 and the P-GW 218 may utilize an S5/S8a interface to exchange user plane data via a protocol stack comprising an L1 layer, an L2 layer, the UDP/IP layer 552, and the GTP-U 553. As discussed previously, NAS protocols may support the mobility of the UE 101 and the session management procedures to establish and maintain IP connectivity between the UE 101 and the P-GW 218.

Moreover, although not shown by FIG. 5, an application layer may be present above the AP 563 and/or the transport network layer 554. The application layer may be a layer in which a user of the UE 101, RAN node 111, or other network element interacts with software applications being executed, for example, by application circuitry 305 or application circuitry 305, respectively. The application layer may also provide one or more interfaces for software applications to interact with communications systems of the UE 101 or RAN node 111, such as the baseband circuitry 410. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 6:
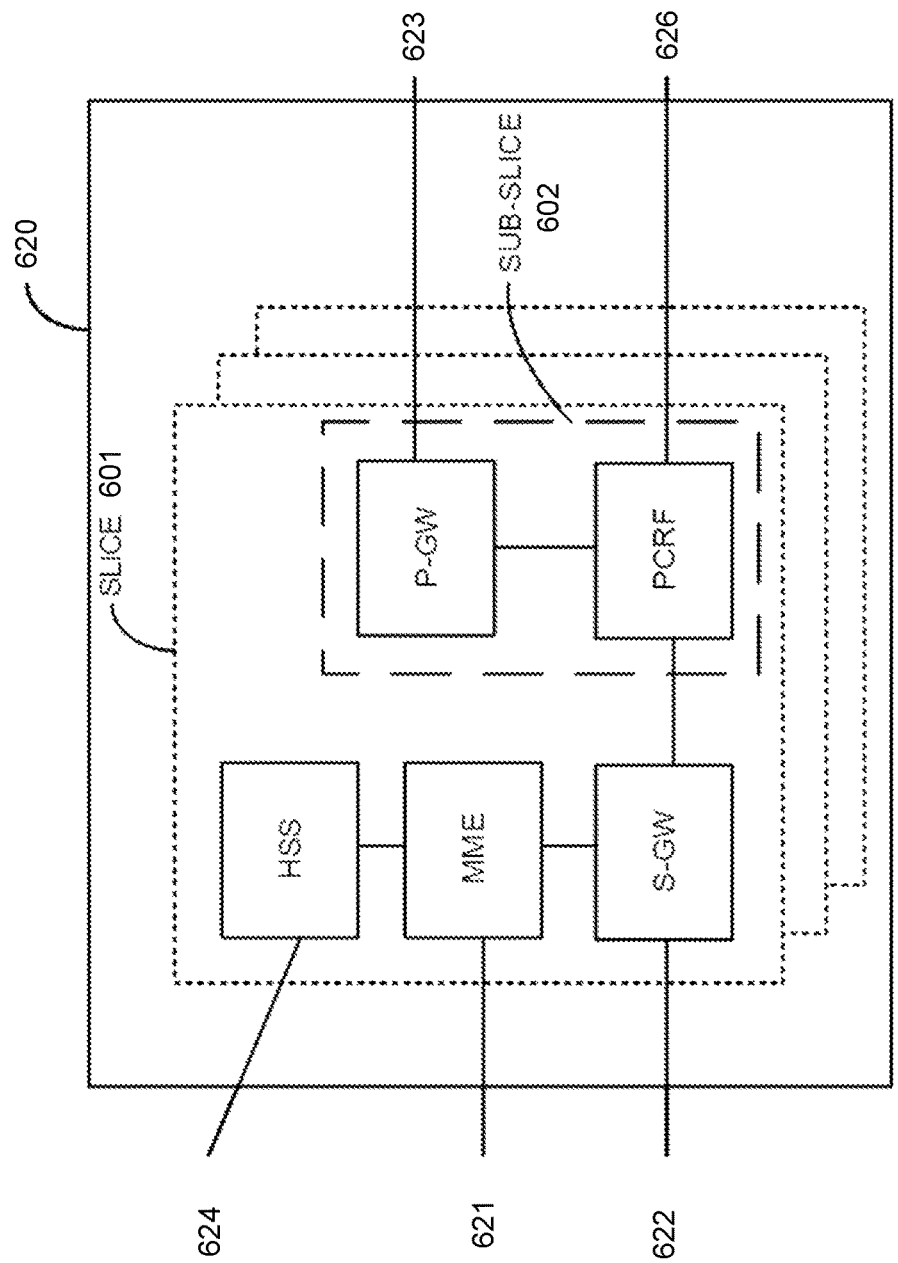
FIG. 6 illustrates a block diagram of exemplary core network components, according to an embodiment.

FIG. 6 illustrates components of a core network in accordance with various embodiments. The components of the CN 220 may be implemented in one physical node or separate physical nodes including components to read and execute instructions from a machine-readable or computer-readable medium (e.g., a non-transitory machine-readable storage medium). In embodiments, the components of CN 240 may be implemented in a same or similar manner as discussed herein with regard to the components of CN 220. In some embodiments, NFV is utilized to virtualize any or all of the above-described network node functions via executable instructions stored in one or more computer-readable storage mediums (described in further detail below). A logical instantiation of the CN 220 may be referred to as a network slice 601, and individual logical instantiations of the CN 220 may provide specific network capabilities and network characteristics. A logical instantiation of a portion of the CN 220 may be referred to as a network sub-slice 602 (e.g., the network sub-slice 602 is shown to include the P-GW 218 and the PCRF 226).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 2B), a network slice always comprises a RAN part and a CN part. The support of network slicing relies on the principle that traffic for different slices is handled by different PDU sessions. The network can realize the different network slices by scheduling and also by providing different L1/L2 configurations. The UE 201 provides assistance information for network slice selection in an appropriate RRC message, if it has been provided by NAS. While the network can support large number of slices, the UE need not support more than 8 slices simultaneously.

A network slice may include the CN 240 control plane and user plane NFs, NG-RANs 210B in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 201 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 221 instance serving an individual UE 201 may belong to each of the network slice instances serving that UE.

Network Slicing in the NG-RAN 210B involves RAN slice awareness. RAN slice awareness includes differentiated handling of traffic for different network slices, which have been pre-configured. Slice awareness in the NG-RAN 210B is introduced at the PDU session level by indicating the S-NSSAI corresponding to a PDU session in all signaling that includes PDU session resource information. How the NG-RAN 210B supports the slice enabling in terms of NG-RAN functions (e.g., the set of network functions that comprise each slice) is implementation dependent. The NG-RAN 210B selects the RAN part of the network slice using assistance information provided by the UE 201 or the 5GC 240, which unambiguously identifies one or more of the pre-configured network slices in the PLMN. The NG-RAN 210B also supports resource management and policy enforcement between slices as per SLAs. A single NG-RAN node may support multiple slices, and the NG-RAN 210B may also apply an appropriate RRM policy for the SLA in place to each supported slice. The NG-RAN 210B may also support QoS differentiation within a slice.

The NG-RAN 210B may also use the UE assistance information for the selection of an AMF 221 during an initial attach, if available. The NG-RAN 210B uses the assistance information for routing the initial NAS to an AMF 221. If the NG-RAN 210B is unable to select an AMF 221 using the assistance information, or the UE 201 does not provide any such information, the NG-RAN 210B sends the NAS signaling to a default AMF 221, which may be among a pool of AMFs 221. For subsequent accesses, the UE 201 provides a temp ID, which is assigned to the UE 201 by the 5GC 240, to enable the NG-RAN 210B to route the NAS message to the appropriate AMF 221 as long as the temp ID is valid. The NG-RAN 210B is aware of, and can reach, the AMF 221 that is associated with the temp ID. Otherwise, the method for initial attach applies.

The NG-RAN 210B supports resource isolation between slices. NG-RAN 210B resource isolation may be achieved by means of RRM policies and protection mechanisms that should avoid that shortage of shared resources if one slice breaks the service level agreement for another slice. In some implementations, it is possible to fully dedicate NG-RAN 210B resources to a certain slice. How NG-RAN 210B supports resource isolation is implementation dependent.

Some slices may be available only in part of the network. Awareness in the NG-RAN 210B of the slices supported in the cells of its neighbors may be beneficial for inter-frequency mobility in connected mode. The slice availability may not change within the UE's registration area. The NG-RAN 210B and the 5GC 240 are responsible to handle a service request for a slice that may or may not be available in a given area. Admission or rejection of access to a slice may depend on factors such as support for the slice, availability of resources, support of the requested service by NG-RAN 210B.

The UE 201 may be associated with multiple network slices simultaneously. In case the UE 201 is associated with multiple slices simultaneously, only one signaling connection is maintained, and for intra-frequency cell reselection, the UE 201 tries to camp on the best cell. For inter-frequency cell reselection, dedicated priorities can be used to control the frequency on which the UE 201 camps. The 5GC 240 is to validate that the UE 201 has the rights to access a network slice. Prior to receiving an Initial Context Setup Request message, the NG-RAN 210B may be allowed to apply some provisional/local policies, based on awareness of a particular slice that the UE 201 is requesting to access. During the initial context setup, the NG-RAN 210B is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 7:
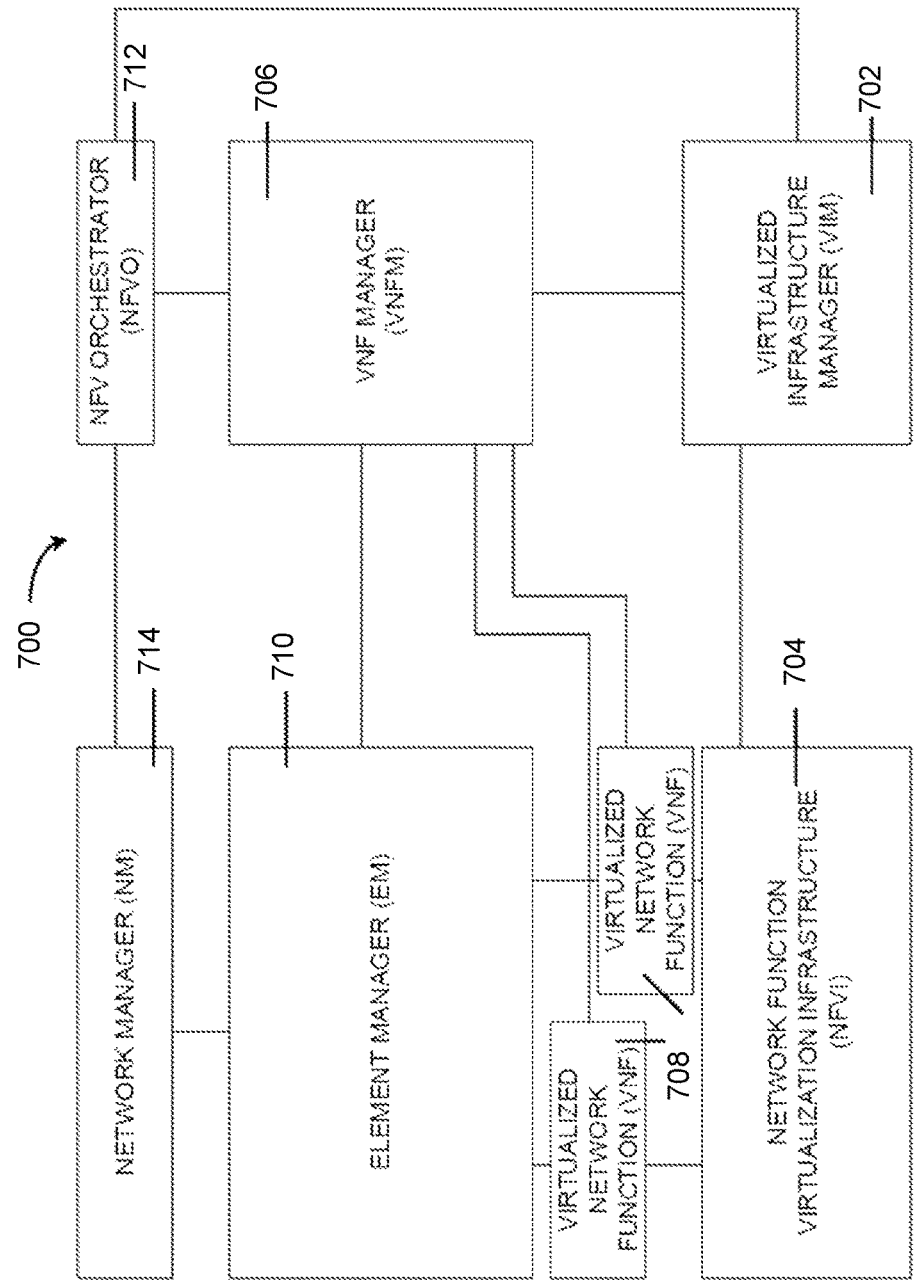
FIG. 7 illustrates a block diagram of system components for supporting network function virtualization, according to an embodiment.

FIG. 7 is a block diagram illustrating components, according to some example embodiments, of a system 700 to support NFV. The system 700 is illustrated as including a VIM 702, an NFVI 704, an VNFM 706, VNFs 708, an EM 710, an NFVO 712, and a NM 714.

The VIM 702 manages the resources of the NFVI 704. The NFVI 704 can include physical or virtual resources and applications (including hypervisors) used to execute the system 700. The VIM 702 may manage the life cycle of virtual resources with the NFVI 704 (e.g., creation, maintenance, and tear down of VMs associated with one or more physical resources), track VM instances, track performance, fault and security of VM instances and associated physical resources, and expose VM instances and associated physical resources to other management systems.

The VNFM 706 may manage the VNFs 708. The VNFs 708 may be used to execute EPC components/functions. The VNFM 706 may manage the life cycle of the VNFs 708 and track performance, fault and security of the virtual aspects of VNFs 708. The EM 710 may track the performance, fault and security of the functional aspects of VNFs 708. The tracking data from the VNFM 706 and the EM 710 may comprise, for example, PM data used by the VIM 702 or the NFVI 704. Both the VNFM 706 and the EM 710 can scale up/down the quantity of VNFs of the system 700.

The NFVO 712 may coordinate, authorize, release and engage resources of the NFVI 704 in order to provide the requested service (e.g., to execute an EPC function, component, or slice). The NM 714 may provide a package of end-user functions with the responsibility for the management of a network, which may include network elements with VNFs, non-virtualized network functions, or both (management of the VNFs may occur via the EM 710).

Figure 8:
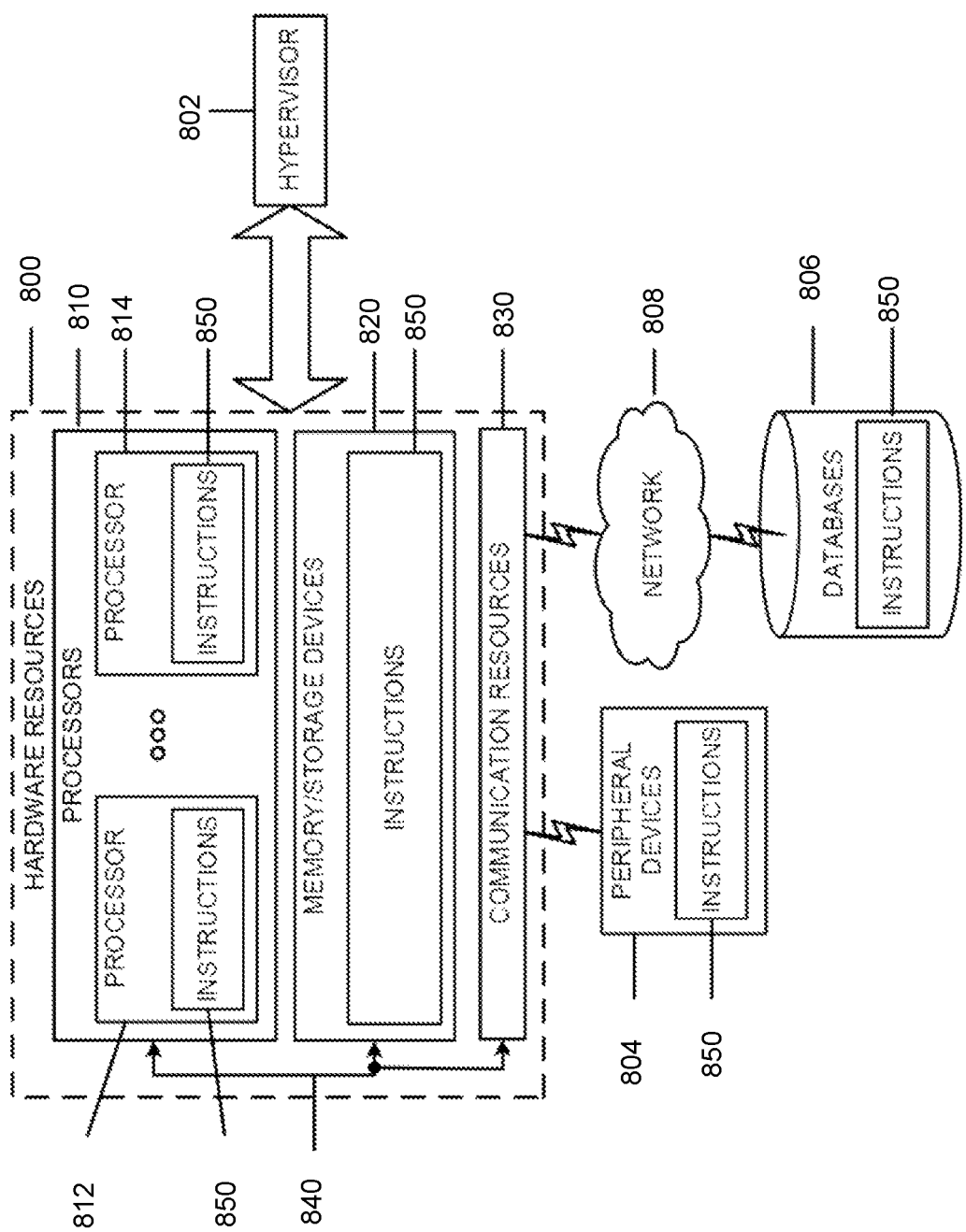
FIG. 8 illustrates a block diagram of an exemplary computer system that can be utilized to implement various embodiments.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processor(s) 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via USB), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example 1 may include the service producer supported by one or more processors, is configured to
receive a request to create a threshold monitoring;
request the NF(s) to monitor the performance measurements;
receive the responses from NF(s) about the performance measurements monitoring request;
respond to the consumer with the result of the threshold monitoring creation request.

Example 2 may include the service producer of example 1 or some other example herein, wherein is further configured to:
receive a request to terminate a threshold monitoring;
request the NF(s) to stop monitoring the performance measurements;
receive the responses from NF(s) about the result of stopping performance measurements monitoring;
respond to the consumer with the result of threshold monitoring termination request.

Example 3 may include the method according to example 1 or some other example herein, wherein the received threshold monitoring request includes the information about at least one of IOC name, IOC instance list, threshold information and monitor granularity period.

Example 4 may include the method according to example 3 or some other example herein, wherein the threshold information includes measurement type name, direction and a list of threshold pack that contains thresholdLevel and thresholdValue.

Example 5 may include the method according to example 1 or some other example herein, wherein the response indicating the threshold monitoring creation includes id of the monitoring and/or the information about the unsupported iOC instance(s), unsupported measurement type name(s) and reason(s).

Example 6 may include the method according to example 2 or some other example herein, wherein the request of the threshold monitoring termination includes id of the monitoring.

Example 7 may include an entity, supported by one or more processors, that is configured to send a notification to the consumer when the threshold of the threshold monitoring is reached or crossed.

Example 8 may include the entity of the method of example 7 or some other example herein, wherein is the service producer as said in claim 1, or a NF.

Example 9 may include the method according to example 7 or some other example herein, wherein the notification includes one or more of the following information:
the object class and instance of the entity that sends the notification;
the monitored object instance;
id of the notification;
time stamp of the notification being sent;
id of the monitoring;
time stamp of the start of the monitoring granularity period;
time stamp of the end of the monitoring granularity period;
threshold level has been reached or crossed;
the monitored measurement type name that has reached or crossed the threshold;
the value of the measurement.

Example 10 may include the method according to examples 7-9 or some other example herein, wherein the notification is emitted immediately when the cumulative counter of measured events reached or crossed the threshold, without waiting to the end of the monitoring granularity period.

Example 11 may include the method according to examples 7-9 or some other example herein, wherein the notification is emitted at the end of the monitoring granularity period for the non-cumulative counters if the measurement value reached or crossed the threshold.

Example 12 is a method comprising:
receiving a monitoring request to monitor a performance measurement over a granularity period;
determining that a counter that corresponds to the first performance measurement has exceeded a threshold prior to the end of the granularity period; and
transmitting or causing to transmit, prior to the end of the granularity period, a report to indicate that the counter has exceeded the threshold.

Example 13 is the method of Example 12, wherein the performance measurement is a first performance measurement, the threshold is a first threshold, and the report is a first report, and wherein the method further comprises:
monitoring a second performance measurement; and
transmitting or causing to transmit, after the end of the granularity period, a second report to indicate that the second performance measurement crossed a second threshold during the granularity period.

Example 14 is the method of Example 12-13 or another example herein, wherein the counter is a cumulative counter.

Example 15 is the method of Example 14 or another example herein, wherein the report is transmitted prior to the end of the granularity period based on the counter being the cumulative counter.

Example 16 is the method of Example 13-15 or another example herein, wherein the second performance measurement is a non-cumulative value.

Example 17 is the method of Example 16 or another example herein, wherein the second report is transmitted after the end of the granularity period based on the second performance measurement being the non-cumulative value.

Example 18 is the method of Examples 12-17 or another example herein, wherein the first performance measurement is a number of failed handovers for a user equipment (UE).

Example 19 is the method of Examples 13-18 or another example herein, wherein the second performance measurement corresponds to an average or maximum value over the granularity period.

Example 20 is the method of Examples 12-19 or another example herein, wherein the monitoring request includes one or more of an IOC name, an IOC instance list, threshold information, or an indication of the granularity period.

Example 21 is the method of Examples 12-20 or another example herein, wherein the report includes one or more of:

the object class and instance of the entity that sends the report;
the monitored object instance;
id of the report;
time stamp of the report being sent;
id of the monitoring;
time stamp of the start of the granularity period;
time stamp of the end of the granularity period;
threshold level that has been reached or crossed;
the monitored measurement type name that has reached or crossed the threshold; or
the value of the measurement.

Example 22 is the method of Examples 12-21 or another example herein, wherein all or certain aspects of the method is performed by a network function or a portion thereof.

Example 23 is the method of Examples 12-21 or another example herein, wherein all or certain aspects of the method is performed by a UE.

Example 23 is the method of Examples 12-23 or another example herein, wherein the report is transmitted to a UE.

Example 24 is a method comprising:
transmitting or causing to transmit a monitoring request to monitor a performance measurement over a granularity period; and
receiving, prior to the end of the granularity period, a notification to indicate that a counter corresponding to the performance measurement has exceeded a threshold.

Example 25 is the method of Example 24 or another example herein, wherein the performance measurement is a first performance measurement, the threshold is a first threshold, and the notification is a first notification, and wherein the method further comprises:
receiving, after the end of the granularity period, a second notification to indicate that a second performance measurement crossed a second threshold during the granularity period.

Example 26 is the method of Example 24-25 or another example herein, wherein the counter is a cumulative counter.

Example 27 is the method of Example 26 or another example herein, wherein the notification is received prior to the end of the granularity period based on the counter being the cumulative counter.

Example 28 is the method of Example 25-27 or another example herein, wherein the second performance measurement is a non-cumulative value.

Example 29 is the method of Example 28 or another example herein, wherein the second notification is received after the end of the granularity period based on the second performance measurement being the non-cumulative value.

Example 30 is the method of Examples 24-29 or another example herein, wherein the first performance measurement is a number of failed handovers for a user equipment (UE).

Example 31 is the method of Examples 25-30 or another example herein, wherein the second performance measurement corresponds to an average or maximum value over the granularity period.

Example 32 is the method of Examples 24-31 or another example herein, wherein the monitoring request includes one or more of an IOC name, an IOC instance list, threshold information, or an indication of the granularity period.

Example 33 is the method of Examples 24-32 or another example herein, wherein the notification includes one or more of:
the object class and instance of the entity that sends the notification;
the monitored object instance;
id of the notification;
time stamp of the notification being sent;
id of the monitoring;
time stamp of the start of the granularity period;
time stamp of the end of the granularity period;
threshold level that has been reached or crossed;
the monitored measurement type name that has reached or crossed the threshold; or
the value of the measurement.

Example 34 is the method of Examples 24-33 or another example herein, wherein all or certain aspects of the method is performed by a network function or a portion thereof.

Example 35 is the method of Examples 24-33 or another example herein, wherein all or certain aspects of the method is performed by a UE.

Example 36 may include an apparatus comprising means to perform one or more elements of a method described in or related to any of examples 1-35, or any other method or process described herein.

Example 37 may include one or more non-transitory computer-readable media comprising instructions to cause an electronic device, upon execution of the instructions by one or more processors of the electronic device, to perform one or more elements of a method described in or related to any of examples 1-35, or any other method or process described herein.

Example 38 may include an apparatus comprising logic, modules, or circuitry to perform one or more elements of a method described in or related to any of examples 1-35, or any other method or process described herein.

Example 39 may include a method, technique, or process as described in or related to any of examples 1-35, or portions or parts thereof.

Example 40 may include an apparatus comprising: one or more processors and one or more computer-readable media comprising instructions that, when executed by the one or more processors, cause the one or more processors to perform the method, techniques, or process as described in or related to any of examples 1-35, or portions thereof.

Example 41 may include a signal as described in or related to any of examples 1-35, or portions or parts thereof.

Example 42 may include a signal in a wireless network as shown and described herein.

Example 43 may include a method of communicating in a wireless network as shown and described herein.

Example 44 may include a system for providing wireless communication as shown and described herein.

Example 45 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein, but are not meant to be limiting.
3GPP Third Generation Partnership Project
4G Fourth Generation
5G Fifth Generation 5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Spécial Mobile
GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signalling messages (TSG T WG3 context)
MANO Management and Orchestration
MBMS Multimedia Broadcast and Multicast Service MBSFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Service Discovery Protocol (Bluetooth related)
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastructure
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
ES EXpected user RESponse
XOR eXclusive OR
ZC Zadoff-Chu
ZP Zero Power Terminology For the purposes of the present document, the following terms and definitions are applicable to the examples and embodiments discussed herein, but are not meant to be limiting.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. A management service producer within a network node of a communication network, the management service producer comprising:
   one or more processors configured to:
   receive a request from a consumer for performance measurement monitoring, wherein the request from the consumer includes a monitoring granularity period to be used during the performance measurement monitoring and wherein a cumulative counter is used to accumulate a performance measurement value during the monitoring granularity period;

transmit a monitoring request to a network function to monitor performance measurements;

receive a response from the network function indicating whether the performance measurement monitoring will be performed for the consumer; and transmit a response to the consumer based on the response from the network function, wherein the performance measurement value in the cumulative counter is initialized during the monitoring granularity period.

2. The management service producer of claim 1, wherein the monitoring request defines threshold information.

3. The management service producer of claim 2, wherein the threshold information includes a measurement type and a threshold value.

4. The management service producer of claim 2, wherein the performance measurements are monitored according to the threshold information and the monitoring granularity period.

5. The management service producer of claim 1, wherein the request from the consumer includes an identification of an information object class and an information object class instance list.

6. The management service producer of claim 5, wherein the response from the network function indicates that the monitoring request was denied, and wherein the response from the network function includes a reason for denial including that at least one of the identified information object class or a measurement type is unsupported.

7. An apparatus for monitoring performance measurements within a communication network, the apparatus comprising:

one or more processors configured to:

receive a performance measurement monitoring request that includes a monitoring granularity period to be used during a performance measurement monitoring, wherein a cumulative counter is used to accumulate a performance measurement value during the monitoring granularity period;

initialize the performance measurement value in the cumulative counter during the monitoring granularity period;

measure a performance measurement associated with the monitoring granularity period;

compare the performance measurement to a threshold value; and conduct a notification process based on the comparison.

8. The apparatus of claim 7, wherein, to perform the notification process, the one or more processors are further configured to:

determine, based on the comparison, that the performance measurement exceeded the threshold value, and transmit a notification to a consumer that requested the performance measurement monitoring; or determine, based on the comparison, that the performance measurement did not exceed the threshold value, and continue to measure without transmitting the notification.

9. The apparatus of claim 8, wherein the performance measurement and comparison are performed at an end of the monitoring granularity period.

10. The apparatus of claim 9, wherein the notification process is performed at the end of the monitoring granularity period.

11. The apparatus of claim 8, wherein the performance measurement and comparison are performed at multiple intervals throughout the monitoring granularity period.

12. The apparatus of claim 11, wherein the notification process is performed at one or more of the multiple intervals within the monitoring granularity period.

13. The apparatus of claim 7, wherein the threshold value and the monitoring granularity period are defined by a request received from a consumer.

14. A method for monitoring performance measurements within a communication network, the method comprising:

receiving a request for performance measurement monitoring that includes a monitoring granularity period to be used during the performance measurement monitoring, wherein a cumulative counter is used to accumulate a performance measurement value during the monitoring granularity period;

initializing the performance measurement value in the cumulative counter during the monitoring granularity period;

measuring a performance measurement associated with the monitoring granularity period;

comparing the performance measurement to a threshold value; and conducting a notification process based on the comparison.

15. The method of claim 14, wherein the notification process includes:

determining, based on the comparison, that the performance measurement exceeded the threshold value, and transmitting a notification to a consumer that requested the performance measurement monitoring; or determining, based on the comparison, that the performance measurement did not exceed the threshold value, and continuing measuring the performance measurement without transmitting the notification.

16. The method of claim 15, wherein the measuring and comparing are performed at an end of the monitoring granularity period.

17. The method of claim 16, wherein the notification process is performed at the end of the monitoring granularity period.

18. The method of claim 15, wherein the measuring and comparing are performed at multiple intervals within the monitoring granularity period.

19. The method of claim 18, wherein the notification process is performed at one or more of the multiple intervals within the monitoring granularity period.

* * * * *